United States Patent
Iwata

(10) Patent No.: US 9,228,848 B2
(45) Date of Patent: Jan. 5, 2016

(54) TRAFFIC CONTROL DEVICE AND TRAFFIC CONTROL SYSTEM

(75) Inventor: Yasunari Iwata, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/386,139

(22) PCT Filed: Mar. 22, 2012

(86) PCT No.: PCT/JP2012/057397
§ 371 (c)(1),
(2), (4) Date: Sep. 18, 2014

(87) PCT Pub. No.: WO2013/140586
PCT Pub. Date: Sep. 26, 2013

(65) Prior Publication Data
US 2015/0066350 A1 Mar. 5, 2015

(51) Int. Cl.
*G01C 21/34* (2006.01)
*G01C 21/36* (2006.01)
(Continued)

(52) U.S. Cl.
CPC ........ *G01C 21/3469* (2013.01); *G01C 21/3492* (2013.01); *G01C 21/3697* (2013.01); *G08G 1/00* (2013.01); *G08G 1/09685* (2013.01); *G08G 1/096716* (2013.01); *G08G 1/096758* (2013.01); *G08G 1/096775* (2013.01); *G08G 1/096816* (2013.01)

(58) Field of Classification Search
USPC ........................................................ 701/400
See application file for complete search history.

(56) References Cited

U.S. PATENT DOCUMENTS 5,428,544 A * 6/1995 Shyu .................. G01C 21/3492
340/902
8,009,028 B2 * 8/2011 Uesaka .................... B60Q 9/00
340/438
(Continued)

FOREIGN PATENT DOCUMENTS

CN 101294817 A * 10/2008
JP 2000-2553 1/2000
(Continued)

OTHER PUBLICATIONS

International Search Report issued May 22, 2012, in PCT/JP12/057397 filed Mar. 22, 2012.

*Primary Examiner* — Shelley Chen
(74) *Attorney, Agent, or Firm* — Oblon, McClelland, Maier & Neustadt, L.L.P.

(57) ABSTRACT

A traffic control device and a traffic control system are provided, and the traffic control device includes a route calculating unit configured to detect candidates of a route to a destination, and decide a guidance route from the detected route candidates, an infrastructure communicating unit configured to acquire signal cycle information related to a cycle at which a display of a traffic signal at a traffic signal location on the route calculated by the route calculating unit is switched, and a fuel consumption simulating unit configured to perform fuel consumption simulation including fuel economy improvement assistance executed at a time of passing the traffic signal location with respect to the route candidates based on the signal cycle information acquired by the infrastructure communicating unit, and the route calculating unit decides the guidance route based on the fuel consumption simulation calculated corresponding to the route candidates by the fuel consumption simulating unit.

11 Claims, 10 Drawing Sheets

(51) Int. Cl.
*G08G 1/00* (2006.01)
*G08G 1/0967* (2006.01)
*G08G 1/0968* (2006.01)

(56) References Cited

U.S. PATENT DOCUMENTS

| | | | | |
|---|---|---|---|---|
| 2006/0009188 | A1* | 1/2006 | Kubota | G08G 1/096725 |
| | | | | 455/344 |
| 2007/0208467 | A1* | 9/2007 | Maguire | B60K 6/48 |
| | | | | 701/22 |
| 2009/0063045 | A1* | 3/2009 | Figueroa | G01C 21/26 |
| | | | | 701/414 |
| 2010/0070128 | A1* | 3/2010 | Johnson | G08G 1/096783 |
| | | | | 701/31.4 |
| 2010/0073158 | A1* | 3/2010 | Uesaka | B60R 16/0236 |
| | | | | 340/450.2 |
| 2010/0145569 | A1 | 6/2010 | Bourque et al. | |
| 2011/0130964 | A1* | 6/2011 | Kitagawa | G01C 21/3697 |
| | | | | 701/301 |
| 2012/0004838 | A1* | 1/2012 | Lee | G01C 21/3469 |
| | | | | 701/123 |
| 2012/0179365 | A1* | 7/2012 | Miyahara | G01C 21/3617 |
| | | | | 701/428 |
| 2013/0103290 | A1* | 4/2013 | Hardin | G08G 1/0112 |
| | | | | 701/117 |

FOREIGN PATENT DOCUMENTS

| | | | |
|---|---|---|---|
| JP | 2008-290610 | | 12/2008 |
| JP | 2010-164360 | | 7/2010 |
| JP | 2010164360 | A * | 7/2010 |
| JP | 2011-95828 | A | 5/2011 |
| JP | 2011-253379 | A | 12/2011 |

* cited by examiner

TRAFFIC CONTROL DEVICE AND TRAFFIC CONTROL SYSTEM

FIELD

The present invention relates to a traffic control device and a traffic control system, which are capable of assisting driving of vehicles.

BACKGROUND

Vehicles such as automobiles have various kinds of functions for improving a fuel economy. As one of the functions for improving a fuel economy, there is a function of extracting a route capable of further improving a fuel economy in view of a fuel economy at the time of traveling using route candidates in the case of guiding a route to a destination. For example, Patent Literature 1 discloses a route search device that acquires cycle information capable of specifying a period of time between a start and an end of a stop instruction in each of traffic signals installed on route candidates from an information center, calculates a stoppage fuel consumption amount consumed while a vehicle is temporarily stopping according to a stop instruction of each traffic signal using the cycle information of each of the traffic signals installed on the route candidates, and searches for a guidance route causing a total fuel consumption amount to be minimum using the stoppage fuel consumption amount and the fuel consumption amount of each zone.

In recent years, so-called hybrid vehicles including both an internal-combustion engine (engine) that burns a fuel as a power source and a motor (motor generator) that is driven by electric power have been developed as vehicles such as automobiles. The hybrid vehicle includes a control device that controls switching among traveling using the engine as a power source, traveling using the motor generator as a power source, and traveling using both the engine and the motor generator as a power source. For example, Patent Literature 2 discloses a car navigation device that detects a charging amount of a battery supplying a motor with electric power, and performs simulation related to a traveling method in which a hybrid vehicle travels along each of guidance routes formed between a current location and a destination based on the detected charging amount of the battery and map data. In the simulation, the car navigation device subdivides each guidance route for each traveling method, weights each subdivided zone according to each traveling method, and proposes a guidance route capable of reducing a fuel consumption amount of an engine based on a sum of the weights of the respective zones.

CITATION LIST

Patent Literature

Patent Literature 1: Japanese Patent Application Laid-open No. 2010-164360
Patent Literature 2: Japanese Patent Application Laid-open No. 2008-290610

SUMMARY

Technical Problem

In the devices disclosed in Patent Literatures 1 and 2, it is possible to search for (extracting) a route to a destination and improve a fuel economy. However, there is a room for improvement in a method of searching for a route to a destination.

It is an object of the present invention to provide a traffic control device and a traffic control system, which are capable of extracting a guidance route capable of improving a fuel economy.

Solution to Problem

In order to achieve the above mentioned object, a traffic control device according to the present invention includes a route calculating unit configured to detect candidates of a route to a destination, and decide a guidance route from the detected route candidates; an infrastructure communicating unit configured to acquire signal cycle information related to a cycle at which a display of a traffic signal at a traffic signal location on the route calculated by the route calculating unit is switched; and a fuel consumption simulating unit configured to perform fuel consumption simulation including fuel economy improvement assistance executed at a time of passing the traffic signal location with respect to the route candidates based on the signal cycle information acquired by the infrastructure communicating unit, wherein the route calculating unit decides the guidance route based on the fuel consumption simulation calculated corresponding to the route candidates by the fuel consumption simulating unit.

Here, it is preferable that the fuel economy improvement assistance includes an assistance of notifying a driver of an accelerator-off timing when the traffic signal displays passing prohibition at a time of arrival at the traffic signal location.

Further, it is preferable that the fuel economy improvement assistance includes an assistance of notifying a driver of a speed range capable of passing through the traffic signal location while the traffic signal is in a passage allowance display state.

Further, it is preferable that the route calculating unit decides a route having a smallest fuel consumption amount as the guidance route based on the fuel consumption simulation.

A traffic control system according to the present invention includes the traffic control device according to any one of the above; and a vehicle configured to perform communication with the traffic control device, transmit destination information and current position information to the traffic control device, acquire the guidance route transmitted from the traffic control device, and assist driving of the driver based on the acquired guidance route.

Advantageous Effects of Invention

The traffic control device and the traffic control system according to the present invention have an effect capable of extracting a guidance route capable of further improving a fuel economy.

DESCRIPTION OF EMBODIMENTS

Hereinafter, a traffic control device and a traffic control system according to an exemplary embodiment of the present invention will be described in detail with reference to the appended drawings. The invention is not limited by the following embodiment. Further, among components in the following embodiment, components that can be easily assumed by a person skilled in the art or that are substantially the same are included.

(Embodiment)

Figure 1:
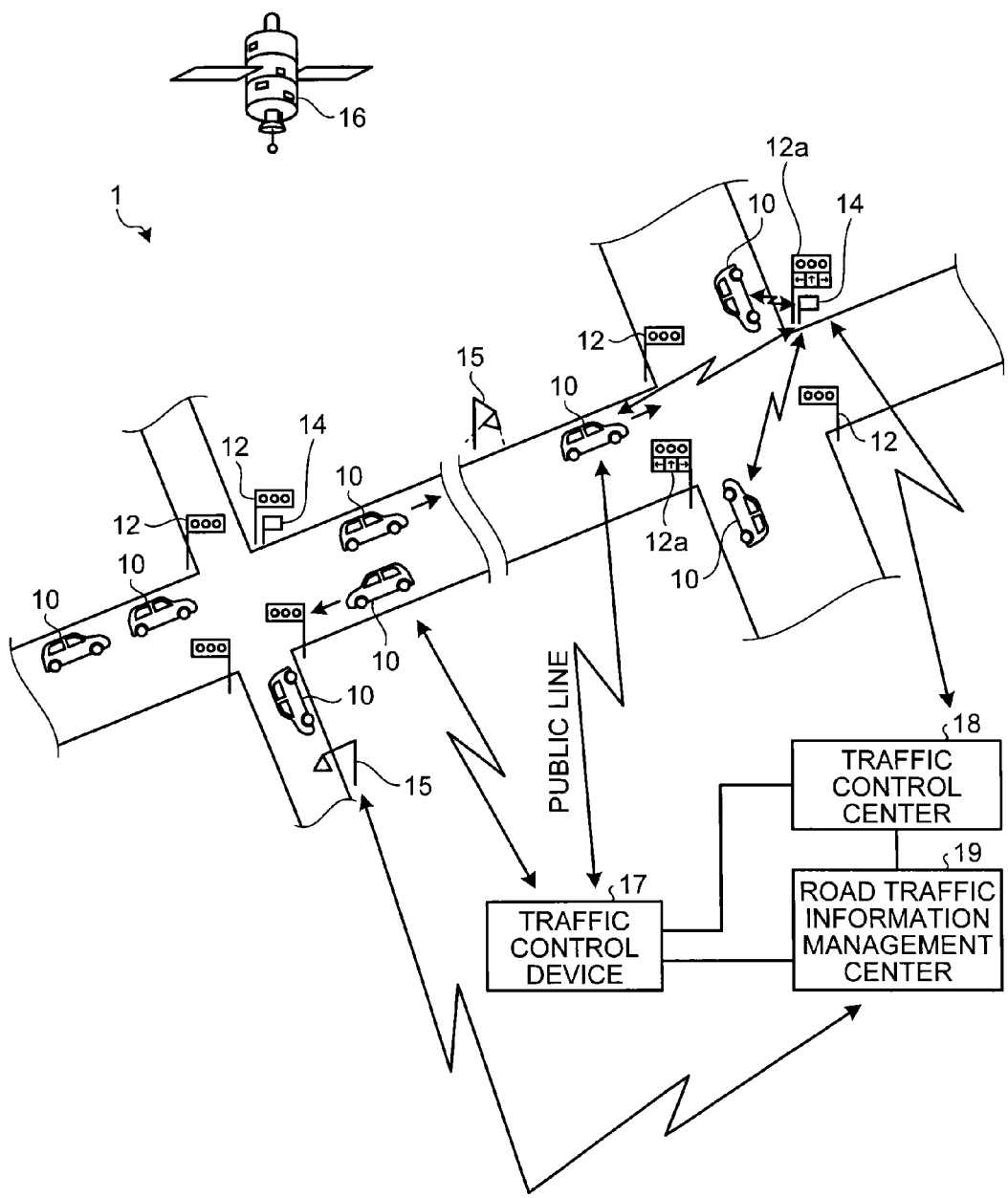
FIG. 1 is an explanatory diagram illustrating an exemplary traffic control system according to the present embodiment.
Figure 2:
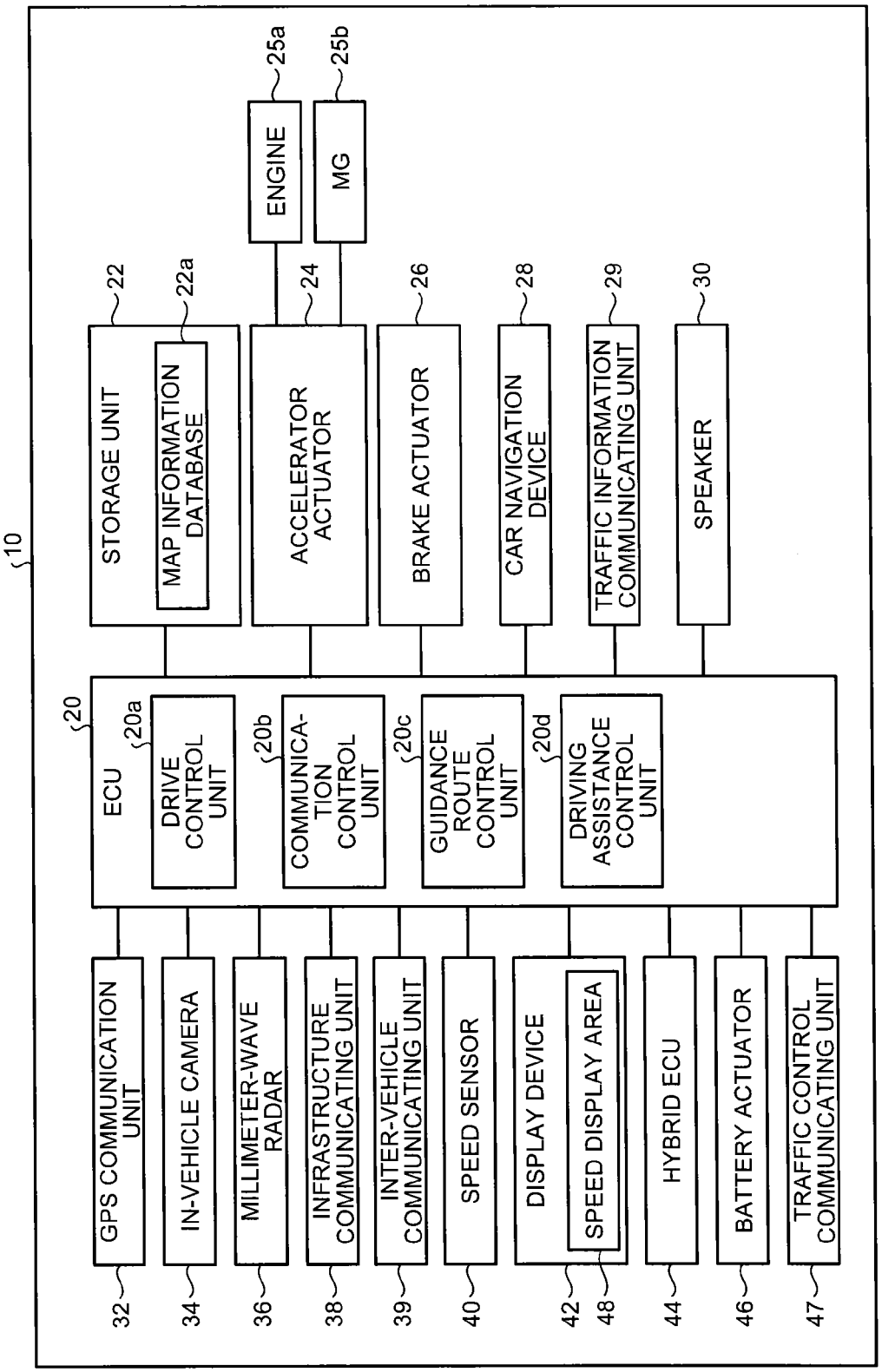
FIG. 2 is a block diagram illustrating a schematic configuration of a vehicle according to an embodiment.
Figure 3:
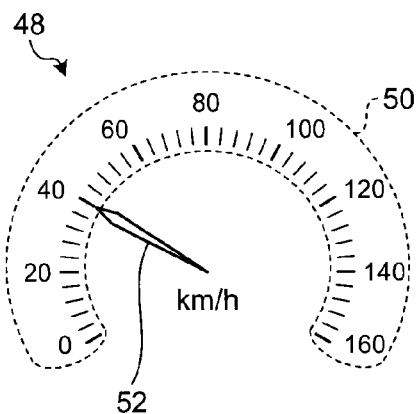
FIG. 3 is a schematic diagram illustrating an exemplary speed display area of a display device.
Figure 4:
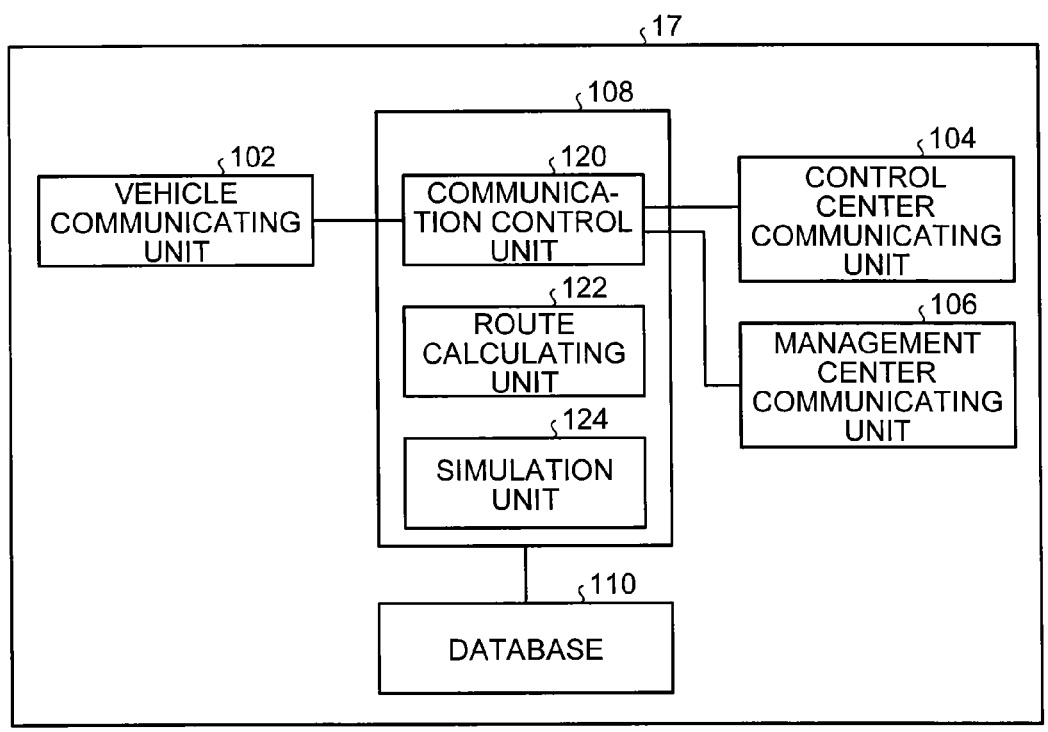
FIG. 4 is a block diagram illustrating a schematic configuration of a traffic control device according to an embodiment.

An embodiment will be described with reference to FIGS. 1 to 5. The present embodiment relates to a traffic control device and a traffic control system having the same. First, a configuration of a traffic control system including a vehicle and a traffic control device will be described with reference to FIGS. 1 to 4. FIG. 1 is an explanatory diagram illustrating an exemplary traffic control system according to the present embodiment. FIG. 2 is a block diagram illustrating a schematic configuration of a vehicle according to an embodiment. FIG. 3 is a schematic diagram illustrating an exemplary speed display area of a display device. FIG. 4 is a block diagram illustrating a schematic configuration of a traffic control device according to an embodiment.

A traffic control system 1 illustrated in FIG. 1 includes a plurality of vehicles 10, a plurality of traffic signals 12 and 12a, a plurality of infrastructure information transmitting devices 14, a plurality of roadside units 15, a GPS satellite 16, a traffic control device 17, a traffic control center 18, and a road traffic information management center 19. The traffic control system 1 is a system in which a guidance route of the vehicle 10 is detected based on information obtained by the traffic control device 17 performing communication with the vehicle 10, the traffic control center 18, and the road traffic information management center 19. Further, the traffic control system 1 is also a system in which driving assistance (that is, assistance of driving of a driver) is performed based on information obtained by the vehicle 10 performing communication with the infrastructure information transmitting device 14, the roadside unit 15, and the GPS satellite 16.

The vehicle 10 is a vehicle capable of traveling on a road such as an automobile or a truck. The vehicle 10 can travel on a road on which the traffic signals 12 and 12a are arranged. A configuration of the vehicle 10 will be described later.

The traffic signals 12 and 12a are lighting devices arranged on intersections. The traffic signal 12 includes lighting parts of three colors of green, yellow, and red. Further, the traffic signal 12a includes a lighting part (arrow signal) that displays an arrow in addition to the lighting parts of three colors of green, yellow, and red. The traffic signals 12 and 12a are arranged on each road in a traveling direction of a vehicle. The traffic signal 12 indicates a state in which the vehicle 10 is allowed to pass through the road in the traveling direction of the vehicle 10 or a state in which the vehicle 10 is not allowed to pass through, that is, a state in which the vehicle 10 should stop by switching a lighting part to emit light among the lighting parts of three colors of green, yellow, and red. In the traffic control system 1 illustrated in FIG. 1, the traffic signals 12 and 12a are assumed to be arranged at intersections, but arrangement locations of the traffic signals 12 and 12a are not limited to an intersection. For example, the traffic signals 12 and 12a may be arranged at pedestrian crossings.

The infrastructure information transmitting device 14 transmits infrastructure information such as road information of a road on which the vehicle 10 travels and signal information related to the traffic signals 12 and 12a in front of the vehicle 10 in the traveling direction of the vehicle 10. The infrastructure information transmitting device 14 according to the present embodiment is arranged for each intersection, and transmits infrastructure information to the vehicle 10 traveling within a certain range therearound through wireless communication, optical communication, or the like. Here, the road information typically includes speed limit information of a road on which the vehicle 10 travels and stop line position information of an intersection. The signal information typically includes signal cycle information such as a lighting cycle or a signal change timing of a green signal, a yellow signal, and a red signal of the traffic signals 12 and 12a. The infrastructure information transmitting device 14 may be installed for each of the traffic signals 12 and 12a or one infrastructure information transmitting device 14 may be installed for a plurality of intersections.

The roadside unit 15 is a traffic information communication base station such as a so-called Intelligent Transport Systems (ITS) spot that outputs road traffic information of a road on which the vehicle 10 travels. The roadside unit 15 according to the present embodiment is arranged at certain intervals, and transmits the road traffic information to the vehicle 10 traveling within a certain range therearound through wireless communication (for example, Dedicated Short Range Communications (DSRC) of 5.8 GHz using a radio beacon), optical communication (for example, communication using an optical beacon), or the like. The road traffic information provided from the roadside unit 15 typically includes road traffic jam information, road work information, and lane closure information. Further, the roadside unit 15 outputs the road traffic information reaching a broad range, for example, about 1,000 km to the vehicle 10. The roadside unit 15 can perform wired or wireless communication with the road traffic information management center 19 that collects the road traffic information, and can acquire real-time (most recent) road traffic information of a broad area by acquiring the road traffic information collected by the road traffic information management center 19 and output the acquired real-time road traffic information to the vehicle 10. FIG. 1 illustrates an example in which the roadside unit 15 performs wireless communication with the road traffic information management center 19.

The GPS satellite 16 is a satellite that outputs a GPS signal necessary for position detection by a Global Positioning System (GPS). Only one GPS satellite 16 is illustrated in FIG. 1, but the traffic control system 1 includes three or more GPS satellites 16. A device that detects a position by the GPS receives GPS signals output from a plurality of GPS satellites 16, and detects coordinates (absolute coordinates, specifically, a latitude, a longitude, and a height) of its own vehicle position using at least three GPS signals selected from the received GPS signals.

The traffic control device 17 performs communication with the vehicle 10, the traffic control center 18, or the road traffic information management center 19, and assists driving of the vehicle 10. The traffic control device 17 performs wireless communication with a traffic control communicating unit 47 (which will be described later) of the vehicle 10 via a public line (a line using a cellular phone communication network, a wireless LAN communication network, or the like) or a dedicated line. The traffic control device 17 preferably performs communication with the vehicle 10 using wireless communication in some communication and may be connected to a wired communication line network. The traffic control device 17 is installed separately from the vehicle 10, and fixed to a position at which communication with the vehicle 10 can be performed. Here, the traffic control device 17 can be easily connected to the traffic control center 18 or the traffic information management center 19, and is arranged in a high-security building in which it is difficult to encounter damage such as theft or breakdown. For example, the traffic control device 17 is installed in a building in which the traffic control center 18 is installed or a building in which the road traffic information management center 19 is installed. The traffic control device 17 is connected with another device through a security system such as a firewall. One traffic control device 17 can assist driving of a plurality of vehicles 10. The traffic control device 17 detects (extracts) a guidance route of the vehicle 10 based on information obtained by communication with the vehicle 10, the traffic control center 18, or the road traffic information management center 19. The traffic control device 17 transmits information of the detected guidance route to the vehicle 10. A configuration of the traffic control device 17 will be described later.

The traffic control center 18 manages infrastructure information such as traffic signal information, and is connected with the traffic control device 17. The traffic control center 18 is installed in an administrative organ (for example, police) that manages road traffic. The traffic control center 18 is connected with another device through a security system such as a firewall. The traffic control center 18 stores information of the signal cycle of the traffic signal installed on a road and the road information, similarly to the infrastructure information transmitting device 14. The traffic control center 18 performs communication with the traffic control device 17, and outputs necessary information to the traffic control device 17. FIG. 1 illustrates an example in which the infrastructure information transmitting device 14 performs wireless communication with the traffic control center 18.

The road traffic information management center 19 is a central management unit that manages information of various kinds of events occurring on a road. The road traffic information management center 19 acquires and manages accident information, traffic jam information, work information, and the like. The road traffic information management center 19 acquires the accident information, the traffic jam information, the work information, or the like through an input from an operator or communication with various kinds of external terminals. The road traffic information management center 19 performs communication with the traffic control device 17, and outputs necessary information to the traffic control device 17. The road traffic information management center 19 outputs various kinds of information to the roadside unit 15 as well.

Next, the vehicle 10 performs communication with the traffic control device 17 will be described with reference to FIG. 2. In the traffic control system 1 illustrated in FIG. 1, all vehicles are regarded as the vehicle 10 having a function of performing communication with the traffic control device 17, but at least one vehicle 10 has only to have a function of performing communication with the traffic control device 17. In other words, in the traffic control system 1, a vehicle that does not perform communication with the traffic control device 17 may travel ahead of or behind the vehicle 10 that performs communication with the traffic control device 17.

The vehicle 10 includes an ECU 20, a storage unit 22, an accelerator actuator 24, an engine 25*a*, a motor generator (MG) 25*b*, a brake actuator 26, a car navigation device 28, a traffic information communicating unit 29, a speaker 30, a GPS communicating unit 32, an in-vehicle camera 34, a millimeter-wave radar 36, an infrastructure communicating unit 38, an inter-vehicle communicating unit 39, a speed sensor 40, a display device 42, a hybrid ECU 44, a battery actuator 46, and the traffic control communicating unit 47. Further, the ECU 20, the storage unit 22, the accelerator actuator 24, the brake actuator 26, the car navigation device 28, the traffic information communicating unit 29, the speaker 30, the GPS communicating unit 32, the in-vehicle camera 34, the millimeter-wave radar 36, the infrastructure communicating unit 38, the inter-vehicle communicating unit 39, the speed sensor 40, the display device 42, the hybrid ECU 44, and the battery actuator 46 of the vehicle 10 configure the driving assisting device of the vehicle 10 together with the traffic control communicating unit 47. Further, the vehicle 10 includes components commonly equipped in a vehicle such as a vehicle body, a brake device, an operating unit (for example, a handle, an accelerator pedal, and a brake pedal), and a battery in addition to the above-mentioned components.

The ECU 20 is an electronic control unit, and controls the respective components of the vehicle 10 such as the accelerator actuator 24, the brake actuator 26, the car navigation device 28, the speaker 30, the GPS communicating unit 32, the in-vehicle camera 34, the millimeter-wave radar 36, the infrastructure communicating unit 38, the inter-vehicle communicating unit 39, the speed sensor 40, and the display device 42. The ECU 20 controls an operation of each component based on information acquired by the GPS communicating unit 32, the in-vehicle camera 34, the millimeter-wave radar 36, the infrastructure communicating unit 38, and the speed sensor 40 or a driver's operation input through various kinds of operating units such as the accelerator pedal or the brake pedal (not illustrated). The ECU 20 includes a drive control unit 20*a*, a communication control unit 20*b*, a guidance route control unit 20*c*, and a driving assistance control unit 20*d*. The drive control unit 20*a*, the communication control unit 20*b*, the guidance route control unit 20*c*, and the driving assistance control unit 20*d* will be described later.

The storage unit 22 is a storage device such as a memory, and stores a condition or data necessary for various kinds of processes performed by the ECU 20 or various kinds of programs executed by the ECU 20. Further, the storage unit 22 stores a map information database 22*a*. The map information database 22*a* stores information (a map, straight path, curve, uphill and downhill roads, a freeway, a sag, a tunnel, and the like) necessary for driving of a vehicle. Further, the map information database 22*a* includes a map data file, an intersection data file, a node data file, and a road data file. The ECU 20 reads necessary information with reference to the map information database 22*a*.

The accelerator actuator 24 controls an output of a power source of the vehicle 10 such as the engine 25*a* and the MG 25*b*. The accelerator actuator 24 can control, for example, an air intake quantity, an air intake timing, and an ignition timing for to the engine 25*a*, a voltage value supplied by the MG 25*b*, a frequency, and the like. The accelerator actuator 24 is electrically connected to the ECU 20, and an operation of the accelerator actuator 24 is controlled by the ECU 20. The ECU 20 operates the accelerator actuator 24 according to an accelerator control signal, and adjusts the air intake quantity, the air intake timing, and the ignition timing for the engine 25*a*, the voltage value supplied by the MG 25*b*, and the frequency. In other words, the accelerator actuator 24 is a device that automatically controls drive force applied by the power source, and receives the accelerator control signal output from the ECU 20, drives the respective components, controls a drive condition, and generates drive force. In this way, the accelerator actuator 24 controls the drive force working on the vehicle 10 such that acceleration is adjusted.

The engine 25*a* causes the drive force to work on the wheels of the vehicle 10 according to an acceleration request operation performed by the driver, for example, an operation of pushing the accelerator pedal. The engine 25*a* burns a fuel and generates engine torque as driving power working on the driving wheels of the vehicle 10. The engine 25*a* is a thermal engine that outputs thermal energy generated as a fuel is burnt in the form of mechanical energy such as torque, and a gasoline engine, a diesel engine, and an LPG engine are examples thereof. The engine 25*a* includes, for example, fuel injection device, an ignition device, and a throttle valve device, and the like, and these devices are electrically connected to the accelerator actuator 24 and controlled by the accelerator actuator 24. Output torque of the engine 25*a* is controlled by the accelerator actuator 24. Further, power generated by the engine 25*a* may be used for power generation in the MG 25*b*.

The MG 25*b* causes the drive force to work on the wheels of the vehicle 10 according to an acceleration request operation performed by the driver, for example, an operation of pushing the accelerator pedal. The MG 25*b* converts electric energy into mechanical power, and generates motor torque as driving power working on the driving wheels of the vehicle 10. The MG 25*b* is a so-called rotating electrical machine including a stator and a rotor. The MG 25*b* serves as not only an electric motor that converts electric energy into mechanical power and outputs mechanical power but also a generator that converts mechanical power into electric energy and regenerates electric energy. In other words, the MG 25*b* has both a function (powering function) as an electric motor that is driven by supply of electric power, converts electric energy into mechanical energy, and outputs mechanical energy and a function (regenerating function) as a generator that converts mechanical energy into electric energy. The MG 25*b* is electrically connected to the accelerator actuator 24 via an inverter that performs conversion between a DC current and an AC current, and controlled by the accelerator actuator 24. The output torque and a power generation amount of the MG 25*b* are controlled by the accelerator actuator 24 through the inverter.

The brake actuator 26 controls driving of the brake device mounted in the vehicle 10. The brake actuator 26 controls, for example, oil pressure of a wheel cylinder installed in the brake device. The brake actuator 26 is electrically connected to the ECU 20, and an operation of the brake actuator 26 is controlled by the ECU 20. The ECU 20 operates the brake actuator 26 according to a brake control signal, and adjusts brake oil pressure of the wheel cylinder. In other words, the brake actuator 26 is a device that automatically controls braking force applied by the brake, and receives the brake control signal output from the ECU 20, drives, for example, a solenoid or a motor of a mechanism that supplies hydraulic fluid to the wheel cylinder to control brake oil pressure, and generates desired braking force. In this way, the brake actuator 26 controls braking force working on the vehicle 10 such that deceleration is adjusted.

The car navigation device 28 is a device that guides the vehicle 10 to a certain destination. The car navigation device 28 can performs two-way communication with the ECU 20. The car navigation device 28 includes a display unit, and causes surrounding map information to be displayed on the display unit based on information stored in the map information database 22*a* and information of a current position acquired by the GPS communicating unit 32 which will be described later. Further, the car navigation device 28 detects a route to a destination based on information stored in the map information database 22*a*, information of a current position acquired by the GPS communicating unit 32 which will be described later, and information of a destination input by the driver or the like, and causes detected route information to be displayed on the display unit. The car navigation device 28 may include a map information database and a GPS communicating unit therein, separately from the map information database 22*a* and the GPS communicating unit 32 and give route guidance or notification of current location information using its internal components.

The traffic information communicating unit 29 performs wireless communication with the roadside unit 15. The traffic information communicating unit 29 acquires the road traffic information transmitted from the roadside unit 15, and transmits the acquired road traffic information to the ECU 20. The traffic information communicating unit 29 may constantly performs communication with the roadside unit 15 that can perform communication therewith to acquire the road traffic information or may perform communication with the roadside unit 15 at certain time intervals to acquire the road traffic information.

The speaker 30 outputs a sound inside the vehicle 10. The speaker 30 outputs a sound corresponding to an audio signal transmitted from the ECU 20.

The GPS communicating unit 32 receives the GPS signals output from the plurality of GPS satellites 16. The GPS communicating unit 32 transfers the received GPS signals to the ECU 20. The ECU 20 analyzes the plurality of received GPS signals, and detects positional information of its own vehicle.

The in-vehicle camera 34 is a photographing device arranged in the front of the vehicle 10, and acquires an image in front of the vehicle 10 (in the traveling direction). The in-vehicle camera 34 transfers the acquired image in front of the vehicle 10 to the ECU 20. The ECU 20 analyzes the image acquired by the in-vehicle camera 34, and thus can acquire information related to a situation in front of the vehicle 10, that is, whether there is another vehicle 10 ahead, whether the traffic signals 12 and 12*a* are nearby, or whether an intersection is nearby.

The millimeter-wave radar 36 is a sensor that measures an inter-vehicle distance between its own vehicle and a front vehicle (a vehicle in front of the vehicle 10). The millimeter-wave radar 36 emits a radio wave of a millimeter-wave band to the front of the vehicle 10, and receives a radio wave that is reflected against an object (front vehicle) and returns to its own vehicle among the emitted radio waves. The millimeter-wave radar 36 compares an output condition of the emitted radio wave with a detection result of the received radio wave, and calculates a distance from the front vehicle. Further, there are cases in which the millimeter-wave radar 36 detects a distance from an obstacle in front of its own vehicle. The millimeter-wave radar 36 transmits information the calculated distance from the front vehicle to the ECU 20. In the present embodiment, the millimeter-wave radar 36 is used as a sensor that measures an inter-vehicle distance between its own vehicle and a front vehicle (a vehicle in front of the vehicle 10), but various kinds of sensors that can measure a distance from an object in front of the vehicle 10 can be used. For example, the vehicle 10 may employ a laser radar sensor instead of the millimeter-wave radar 36.

The infrastructure communicating unit 38 performs wireless communication with the infrastructure information transmitting device 14. The infrastructure communicating unit 38 acquires the infrastructure information transmitted from the infrastructure information transmitting device 14, and transmits the acquired infrastructure information to the ECU 20. The infrastructure communicating unit 38 may constantly perform communication with the infrastructure information transmitting device 14 that can perform communication therewith to acquire the infrastructure information, may perform communication with the infrastructure information transmitting device 14 at certain time intervals to acquire the infrastructure information, or may perform communication with a new infrastructure information transmitting device 14 when the infrastructure communicating unit 38 can perform communication with the new infrastructure information transmitting device 14 to acquire the infrastructure information.

The inter-vehicle communicating unit 39 performs wireless communication with a vehicle ahead of or behind its own vehicle. The inter-vehicle communicating unit 39 can perform communication with a vehicle ahead of or behind its own vehicle and acquire information of the presence or absence of a vehicle ahead of or behind its own vehicle and information of a distance between its own vehicle and a vehicle ahead of or behind its own vehicle. The vehicle 10 according to the present embodiment acquire information related to a vehicle ahead of or behind its own vehicle through the inter-vehicle communicating unit 39, but the present invention is not limited to this example. The vehicle 10 may acquire information of a vehicle ahead of or behind its own vehicle using the in-vehicle camera 34 or the millimeter-wave radar 36 as described above. The speed sensor 40 detects a speed of the vehicle 10. The speed sensor 40 transmits information of the acquired speed to the ECU 20.

The display device 42 is a display device that displays various kinds of information to be presented to the driver, and serves as an instrument panel arranged in, for example, a dashboard of the vehicle 10. The display device 42 may be a liquid crystal display (LCD) device or may be a display device on which various kinds of gauges are arranged. The display device 42 displays information such as a remaining fuel amount, a driving source output (engine revolution), a door open/close state, and a buckled state of a seat belt. The display device 42 has a speed display area 48 in which a vehicle speed is displayed.

The speed display area 48 includes a scale display portion 50 and a pointer 52 as illustrated in FIG. 3. The scale display portion 50 has an arc shape, and has a scale of 0 km/h to 160 km/h. The pointer 52 points at a vehicle speed of a measurement result, and points at 40 km/h in FIG. 3. The speed display area 48 is an analog meter, and the position of the scale display portion 50 indicated by the pointer 52 changes according to a current vehicle speed. Thus, the driver can recognize a detection result of a current vehicle speed by checking the position of the pointer 52 of the speed display area 48.

The hybrid ECU 44 controls the power source that is controlled by the accelerator actuator 24 according to a driving mode of the power source. Here, in the hybrid ECU 44, as the driving mode of the power source, at least an engine driving mode in which drive force is applied to the driving wheel only by the output of the engine 25a, an EV driving mode in which drive force is applied to the driving wheel only by the output of the MG 25b serving as the motor, and a hybrid driving mode in which drive force is applied to the driving wheel by both the output of the engine 25a and the output of the MG 25b are set. The hybrid ECU 44 switches the driving mode based on information such as the driver's driving request, a battery charging state, and a vehicle driving state. Further, the hybrid ECU 44 decides the driving mode that is switchable by the guidance route control unit 20c or the driving assistance control unit 20d based on a driving plan set by the guidance route control unit 20c (which will be described later) of the ECU 20 and control of the driving assistance control unit 20d. The hybrid ECU 44 may enter a state in which only one driving mode is selectable based on the driving plan and the control state of the driving assistance control unit 20d. In this case, the hybrid ECU 44 sets the same driving mode regardless of the driving request, the battery charging state, and the vehicle driving state.

When the engine driving mode is selected, the hybrid ECU 44 sends a control command to the accelerator actuator 24 so that a requested drive force according to the driver's driving request is generated only by the engine torque of the engine 25a in principle. When the EV driving mode is selected, the hybrid ECU 44 sends a control command to the accelerator actuator 24 so that the requested drive force according to the driver's driving request is generated only by the motor torque of the MG 25b in principle. Further, when the hybrid driving mode is selected, the hybrid ECU 44 sends a control command to the accelerator actuator 24 so that the requested drive force according to the driver's driving request is generated by the engine torque of the engine 25a and the output of the MG 25b serving as the motor or the generator in principle.

The battery actuator 46 controls the battery mounted in the vehicle. The battery actuator 46 controls a charging amount and a discharging amount of the battery based on a previously set charging/discharging map.

The traffic control communicating unit (communicating unit for traffic control device) 47 performs wireless communication with the traffic control device 17. The traffic control communicating unit 47 transmits various kinds of information (destination information, current position information, and the like) to the traffic control device 17. Further, the traffic control communicating unit 47 receives information (route information and driving assistance information) calculated by adding various kinds of information acquired from the traffic control communicating unit 47 by the traffic control device 17. The traffic control communicating unit 47 transmits the information acquired from the traffic control device 17 to the ECU 20. The traffic control communicating unit 47 may constantly perform communication with the traffic control device 17 to transceive various kinds of information or may perform communication with the traffic control device 17 at certain time intervals to transceive various kinds of information.

Next, control executed by the drive control unit 20a, the communication control unit 20b, the guidance route control unit 20c, and the driving assistance control unit 20d of the ECU 20 will be described. The drive control unit 20a controls operations of the components related to driving of the vehicle 10 such as the accelerator actuator 24, the brake actuator 26, and the hybrid ECU 44. The drive control unit 20a controls driving of the vehicle 10 by controlling the operations of the components related to driving of the vehicle 10 based on the driver's driving request, the driver's brake request, the detection result of the speed sensor 40, and the like. Further, the drive control unit 20a outputs information acquired from the components connected with the ECU 20 to the accelerator actuator 24, the brake actuator 26, and the hybrid ECU 44.

The communication control unit 20b controls the operations of the communicating units equipped in the vehicle 10, that is, the traffic information communicating unit 29, the GPS communicating unit 32, the traffic control communicating unit 47, and controls communication between the vehicle 10 and another devices. The communication control unit 20b controls a timing at which communication with another device is performed, a type of data to be transceived, a destination of data to be transmitted, and the like.

The guidance route control unit 20c performs two-way communication with the car navigation device 28, and controls an operation of the car navigation device 28. Further, the guidance route control unit 20c acquires destination information or various kinds of condition information input to the car navigation device 28. The guidance route control unit 20c transfers the acquired various kinds of information to the traffic control device 17 through the traffic control communicating unit 47. The guidance route control unit 20c transmits guidance route information transmitted from the traffic control device 17 to the car navigation device 28, and shows the driver the guidance route received by the car navigation device 28.

The driving assistance control unit 20d performs various kinds of calculation processes and various kinds of operations for assisting the driver's driving using the acquired guidance route information, information acquired by various kinds of sensors, or external information acquired through control of the communication control unit 20b. The driving assistance control unit 20d can perform driving assistance of controlling various kinds of driving units through the drive control unit 20a and driving assistance of causing the display device 42 and the like to perform various kinds of displays.

The driving assistance control unit 20d calculates a reference target vehicle speed range based on information acquired by the components of the vehicle 10, processes the calculated reference target vehicle speed range based on a set criterion to decide a target vehicle speed range (target speed range), and causes the decided target vehicle speed range to be displayed on the speed display area 48 of the display device 42. Specifically, the driving assistance control unit 20d calculates a traveling speed range (reference target vehicle speed range) necessary to pass while the traffic signal 12 or 12a is in a state of the green signal (that is, while a traffic signal is in a passage allowance display state) based on the signal cycle information such as the lighting cycle or the signal change timing of the traffic signals 12 and 12a arranged at an intersection or a pedestrian crossing of a passing target acquired by the infrastructure communicating unit 38 and information such as a distance between the vehicle 10 and the traffic signal 12 or 12a (accurately, a distance to an intersection or a pedestrian crossing (which is also referred to as a passing target or a traffic signal location) at which the traffic signal 12 or 12a is arranged. Further, the driving assistance control unit 20d decides the target vehicle speed range based on a current state of a traffic signal arranged at an intersection or a pedestrian crossing (that is, a traffic signal location) of a passing target, and causes the calculated target vehicle speed range (a range of a traveling speed to recommend) to be displayed on the speed display area 48. Further, the driving assistance control unit 20d decides the target vehicle speed range based on a comparison result obtained by comparing the calculated reference target vehicle speed range with a current vehicle speed in addition to a current state of a traffic signal arranged at an intersection or a pedestrian crossing of a passing target, and causes the calculated target vehicle speed range (a range of a traveling speed to recommend) to be displayed on the speed display area 48. The driving assistance control unit 20d performs green wave assistance that is control of giving vehicle speed guidance to the driver so that the number of times in which the vehicle 10 stops at the red signal can be reduced. Further, when the traffic signal is in the passage allowance display state, it represents a state in which the traffic signal is performing a display indicating that it is possible to pass through a target route, and it is not limited to a display of the green signal and includes a state in which an arrow signal is being displayed. Further, a setting can be performed so that a state in which the yellow signal is being displayed also represents that the traffic signal is in the passage allowance display state.

The driving assistance control unit 20d performs guidance assistance of urging the driver to perform a recommended driving operation, typically, a driving operation involving a change by outputting various driving assistance information to the display device 42 based on a target traveling state quantity of the vehicle 10 being traveling. Here, the target traveling state quantity refers to a target traveling state quantity of the vehicle 10 at a certain location or timing, typically, in the vehicle 10 being traveling. The driving assistance control unit 20d performs driving assistance so that the traveling state quantity of the vehicle 10 is the target traveling state quantity at a certain location or timing by outputting the driving assistance information to the display device 42 based on the target traveling state quantity at the certain location or timing and performing assistance of urging the driver to perform a recommended driving operation. For example, when the vehicle stops at a target stop position (a stop line), the driving assistance control unit 20d gives guidance of a timing for releasing the accelerator or a timing for pushing the brake to the driver. Thus, it is possible to give guidance of the driving condition of the vehicle 10 in which the vehicle can stop at the stop position by an operation of a low fuel consumption to the driver.

The driving assistance control unit 20d assists the driver's driving by generating a driving plan based on various kinds of information corresponding to a guidance route and controlling the driving mode based on the generated driving plan. Specifically, the driving assistance control unit 20d controls an operation of the drive control unit 20a, the accelerator actuator 24, or the hybrid ECU 44 so that the vehicle 10 is driven in the decided driving mode. Further, the driving assistance control unit 20d is not limited to the above-described control, and can perform various kinds of driving assistance.

Next, the traffic control device 17 will be described with reference to FIG. 4. The traffic control device 17 includes a vehicle communicating unit 102, a control center communicating unit (an infrastructure information communicating unit) 104, a management center communicating unit (traffic jam information communicating unit) 106, a control unit 108, and a database 110. The traffic control device 17 controls the operation of the respective components, performs a calculation process, detects a guidance route of the vehicle 10, and transmits information of the detected guidance route to the vehicle 10. Further, the traffic control device 17 transmits detected driving assistance information to the vehicle 10 according to a setting together with the guidance route. Here, the database 110 stores various kinds of information necessary for calculation of the guidance route such as map information and basic signal cycle information.

The vehicle communicating unit 102 performs wireless communication with the vehicle 10 of a control target to transceive data. The control center communicating unit (the infrastructure information communicating unit) 104 performs wired or wireless communication with the traffic control center 18 to transceive data (mainly receives the infrastructure information such as the signal cycle information). The management center communicating unit (the traffic jam information communicating unit) 106 performs wired or wireless communication with the road traffic information management center 19 to transceive data (mainly receives information related to a road such as traffic jam information and accident information). The vehicle communicating unit 102, the control center communicating unit 104, and the management center communicating unit 106 transfer the received data to the control unit 108, and transmit data output from the control unit 108 to the corresponding components.

The control unit 108 includes a communication control unit 120, a route calculating unit 122, and a simulation unit 124, and performs control of the respective components and the calculation process. The communication control unit 120 controls operations of the communicating units equipped in the traffic control device 17, that is, the vehicle communicating unit 102, the control center communicating unit 104, and the management center communicating unit 106, and controls communication between the traffic control device 17 and another device. The communication control unit 120 controls a timing at which communication with another device is performed, a type of data to be transceived, a destination of data to be transmitted, and the like.

The route calculating unit (route search unit) 122 detects a guidance route to the destination of the vehicle 10 of the control target. The route calculating unit 122 calculates a guidance route based on information of the destination output from the vehicle 10, information of the database 110, the road traffic information acquired by the traffic information communicating unit 29, information of a current position acquired by the GPS communicating unit 32, and the like. The route calculating unit 122 extracts a plurality of routes reaching to the destination as route candidates, and transfer information of a plurality of extracted route candidates to the simulation unit 124. The route calculating unit 122 specifies a guidance route based on an analysis result of the plurality of route candidates analyzed by the simulation unit 124. The route calculating unit 122 outputs the decided route to the vehicle 10.

The simulation unit 124 analyzes a fuel economy of the vehicle 10 when traveling is performed using the route candidates extracted by the route calculating unit 122. Here, the simulation unit 124 performs simulation of fuel economy improvement assistance executed when the vehicle 10 travels on the route candidates when the analysis is performed. Here, the fuel economy improvement assistance refers to various kinds of driving assistance that is capable of improving a fuel economy and executed when the vehicle 10 travels on a route. Specifically, there are driving assistance of guiding the traveling speed so that the vehicle passes through an intersection location at which the traffic signal is installed without stop, that is, at the green signal, driving assistance of guiding a deceleration pattern (an accelerator-off timing) when the vehicles stops at an intersection location at which the traffic signal is installed due to the red signal or the like, and the like. By using information of the route candidates detected by the route calculating unit 122, information of a current position, data acquired from the traffic control center 18, and data acquired from the road traffic information management center 19, the simulation unit 124 determines a timing at which the vehicle passes through an intersection location or a timing at which the vehicles faces congestion or the like when the vehicle travels on the route candidates, and analyzes the driving assistance to be executed at that time. Thus, the simulation unit 124 can analyze a fuel economy when traveling is performed using a corresponding route while also considering the fuel economy improvement assistance executed when traveling is performed using the corresponding route. The traffic control system 1 has the above-described configuration.

Figure 5:
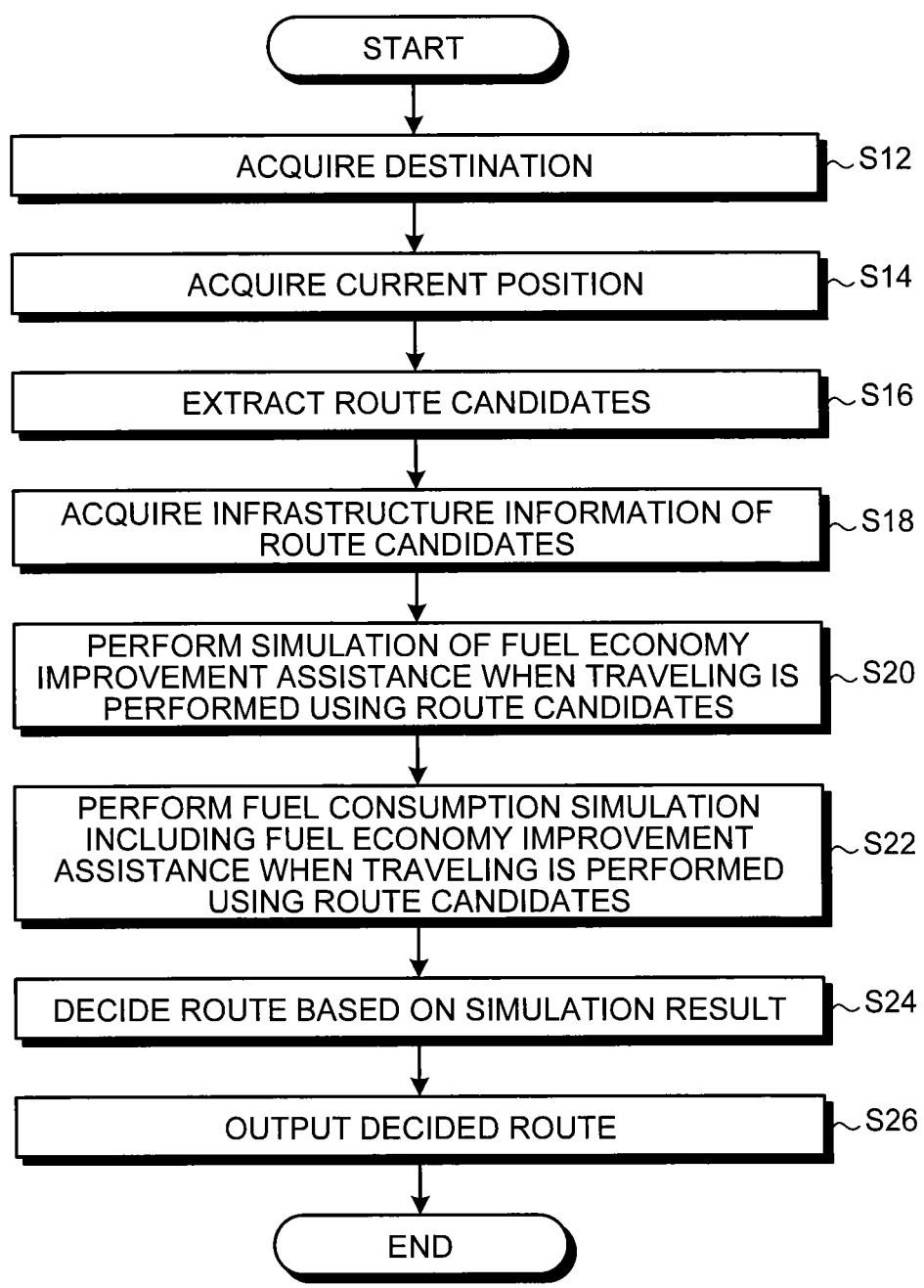
FIG. 5 is a flowchart illustrating an exemplary process of a traffic control device.
Figure 6:
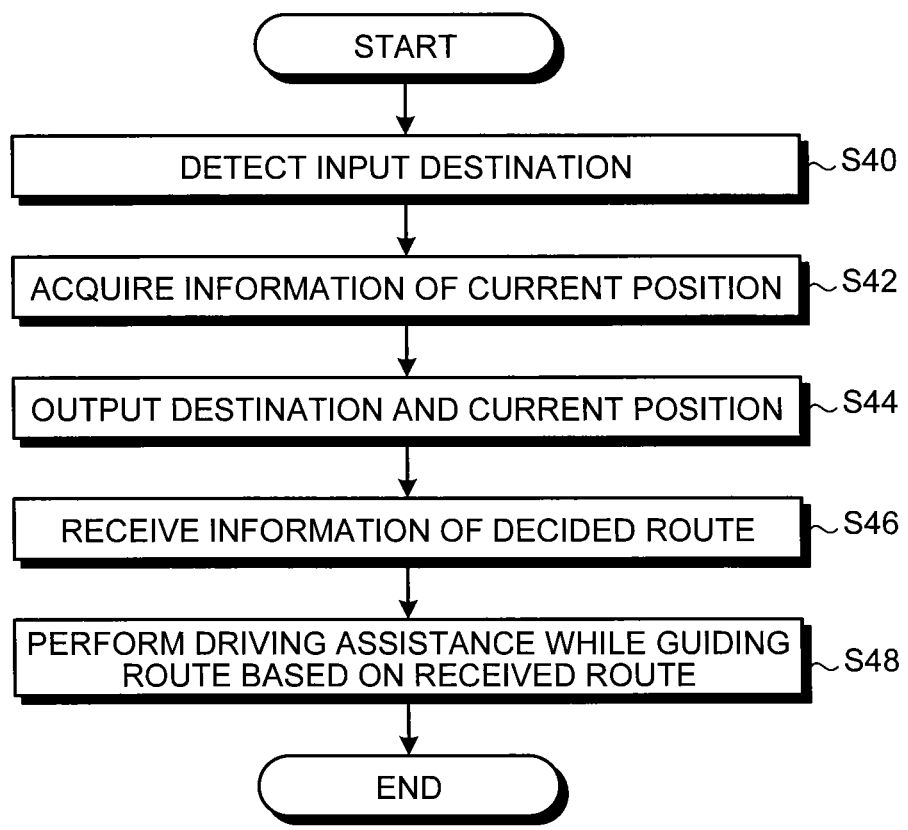
FIG. 6 is a flowchart illustrating an exemplary process of an ECU.

Next, an operation of the traffic control system 1 will be described with reference to FIGS. 5 and 6. FIG. 5 is a flowchart illustrating an exemplary process of the traffic control device. First, an exemplary process of the traffic control device 17 will be described with reference to FIG. 5. The process illustrated in FIG. 5 can be implemented by executing the process through the route calculating unit 122 and the simulation unit 124 of the control unit 108 of the traffic control device 17.

The traffic control device 17 acquires destination information in step S12, and acquires current position information in step S14. In other words, the traffic control device 17 acquires the destination information and the current position information transmitted from the vehicle 10 of the control target. The vehicle 10 transmits a destination input by the driver or the like as the destination information, and transmits positional information generated based on the GPS signals received by the GPS communicating unit 32 as the current position information. The process of step S12 and the process of step S14 may be simultaneously performed or may be performed in reverse order. When acquisition of the destination information is completed, only the current position information may be acquired.

When the current position information is acquired in step S14, in step S16, the traffic control device 17 extracts route candidates. In other words, the traffic control device 17 extracts at least one candidate of a route to a destination based on a current location through the route calculating unit 122. When the route candidates are extracted in step S16, in step S18, the traffic control device 17 acquires the infrastructure information of the route candidates. In other words, for example, the signal cycle information of an intersection location included in the route is acquired. The traffic control device 17 may acquire the traffic jam information of the route candidates that can be acquired through the management center communicating unit 106 in addition to the infrastructure information.

When the infrastructure information is acquired in step S18, in step S20, the traffic control device 17 performs simulation of the fuel economy improvement assistance when traveling is performed using the route candidates. In other words, the traffic control device 17 analyzes the infrastructure information of the candidate routes and a timing at which each position is passed through the simulation unit 124, and detects a traveling pattern when traveling is performed using the candidate routes while performing the fuel economy improvement assistance. Specifically, the simulation unit 124 compares a timing of passing an intersection location with the signal cycle information, and calculates a traveling pattern in which traveling can be performed with a better fuel economy. Here, when the vehicle arrives at an intersection location in which the traffic signal is the red signal, the simulation unit 124 calculates a deceleration pattern in which a fuel economy is further improved, and employs a traveling pattern in which stop is performed according to the deceleration pattern. When the speed is adjusted and so the vehicle arrives at an intersection location in which the traffic signal is the green signal, the simulation unit 124 calculates a traveling pattern in which a traffic signal location can be passed with a traveling pattern in which a fuel economy is further improved.

When the simulation of the fuel economy improvement assistance at the time of traveling is performed in step S20, in step S22, the traffic control device 17 performs fuel consumption simulation including the fuel economy improvement assistance when traveling is performed using the route candidates. In other words, the traffic control device 17 detects a fuel economy of each candidate route through the simulation unit 124 using the simulation result calculated in step S20.

When the fuel consumption simulation is performed in step S22, the traffic control device 17 decides (calculates) a route based on the simulation result in step S24, and outputs the decided route in step S26. The traffic control device 17 decides a route through the route calculating unit 122 by additionally using the simulation result, and outputs the decided route to the vehicle 10 of the control target.

Next, an operation of the vehicle 10 will be described with reference to FIG. 6. FIG. 6 is a flowchart illustrating an exemplary process of the ECU. The process illustrated in FIG. 6 is implemented such that the ECU 20 of the vehicle 10 controls the respective components and executes the process.

The ECU 20 detects an input destination in step S40, and acquires the current position information in step S42. The ECU 20 acquires information input to the car navigation device 28 through the guidance route control unit 20c, and detects an input destination. Further, the ECU 20 acquires positional information acquired by the GPS communicating unit 32 through the communication control unit 20b, and acquires current position information. The ECU 20 may perform the process of step S40 and step S42 in reverse order. Further, when detection of the destination information and detection of the current position information are completed, each process may be omitted.

When the current position information is acquired in step S42, in step S44, the ECU 20 outputs the destination information and the current position information. In other words, the ECU 20 controls the traffic control communicating unit 47 through the communication control unit 20b such that the destination information and the current position information are output (transmitted) to the traffic control device 17.

When the destination information and the current position information are output in step S44, in step S46, the ECU 20 receives information of a route decided. In other words, the ECU 20 receives information of a route detected by the traffic control device 17 performing analysis based on the information transmitted in step S44. When the information of the route is received in step S46, in step S48, the ECU 20 performs the driving assistance (the fuel economy improvement assistance) while giving traveling guidance based on the received route, and then ends the present process. The ECU 20 gives the route guidance and the fuel economy improvement assistance until the vehicle arrives at the destination.

The traffic control system 1 and the traffic control device 17 calculate the guidance route to the destination by additionally considering the fuel economy improvement assistance when traveling is performed using a route, and thus it is possible to obtain a route capable of improving a fuel economy with a high degree of accuracy. In other words, the traffic control device 17 acquires the infrastructure information of the candidate routes, and predicts the fuel economy improvement assistance that is executed when traveling is performed using the candidate routes. The traffic control device 17 calculates a fuel economy when traveling is performed using the candidate routes based on the prediction result, and decides the guidance route based on the result. Thus, it is possible to use a route in which influence of the fuel economy improvement assistance executed by the vehicle 10 at the time of actual traveling is considered as the guidance route and obtains the above-described effects.

In the traffic control system 1 according to the above embodiment, since the traffic control device 17 is configured separately from the vehicle 10, and it is possible to reduce a load of a process executed by a processing device mounted in the vehicle 10. In other words, even when the processing capability of the traffic control device 17 is increased, it is possible to reduce influence on traveling of the vehicle 10 and increase the processing capability of the traffic control device 17. Particularly, in the traffic control system 1, a high-load function of a calculation process such as simulation is not arranged at the vehicle 10 side and arranged as a separate center function, and thus it is possible to increase the processing capability of the calculation device that performs simulation, that is, the processing capability of the traffic control device 17 of the present embodiment without applying a load to the vehicle 10 side. Further, as it is possible to increase the processing capability of the traffic control device 17, more detailed analysis can be performed in a short time. As a result, the traffic control system 1 and the traffic control device 17 can provide a more appropriate route, that is, a route capable of further improving a fuel economy to the vehicle 10 in a short time with a high degree of accuracy. Furthermore, as a plurality of vehicles 10 are collectively managed by the traffic control device 17, it is possible to collect and effectively use information acquired from the outside (the traffic control center 18 and the road traffic information management center 19) such as the infrastructure information and the traffic jam information. In addition, it is possible to suppress the processing loads of the car navigation device 28 and the ECU 20 equipped in the vehicle 10, and thus it is possible to reduce the manufacturing cost of the vehicle 10. Moreover, the traffic control system 1 is preferably configured such that the traffic control device 17 is provided separately from the vehicle 10 and performs wireless communication with the vehicle 10 to transceive data as in the present embodiment, but the present invention is not limited to this example. The traffic control device 17 may be integrated with the vehicle 10, that is, may be mounted in the vehicle 10.

Next, the driving assistance performed by the driving assistance control unit 20d of the ECU 20 of the vehicle 10 will be described with reference to FIGS. 7 to 14. The driving assistance illustrated in FIGS. 7 to 14 is driving assistance included in the fuel economy improvement assistance. The following description will proceed with the driving assistance performed by the vehicle 10, but the simulation unit 124 also performs the same analysis based on a set condition and input information.

Figure 7:
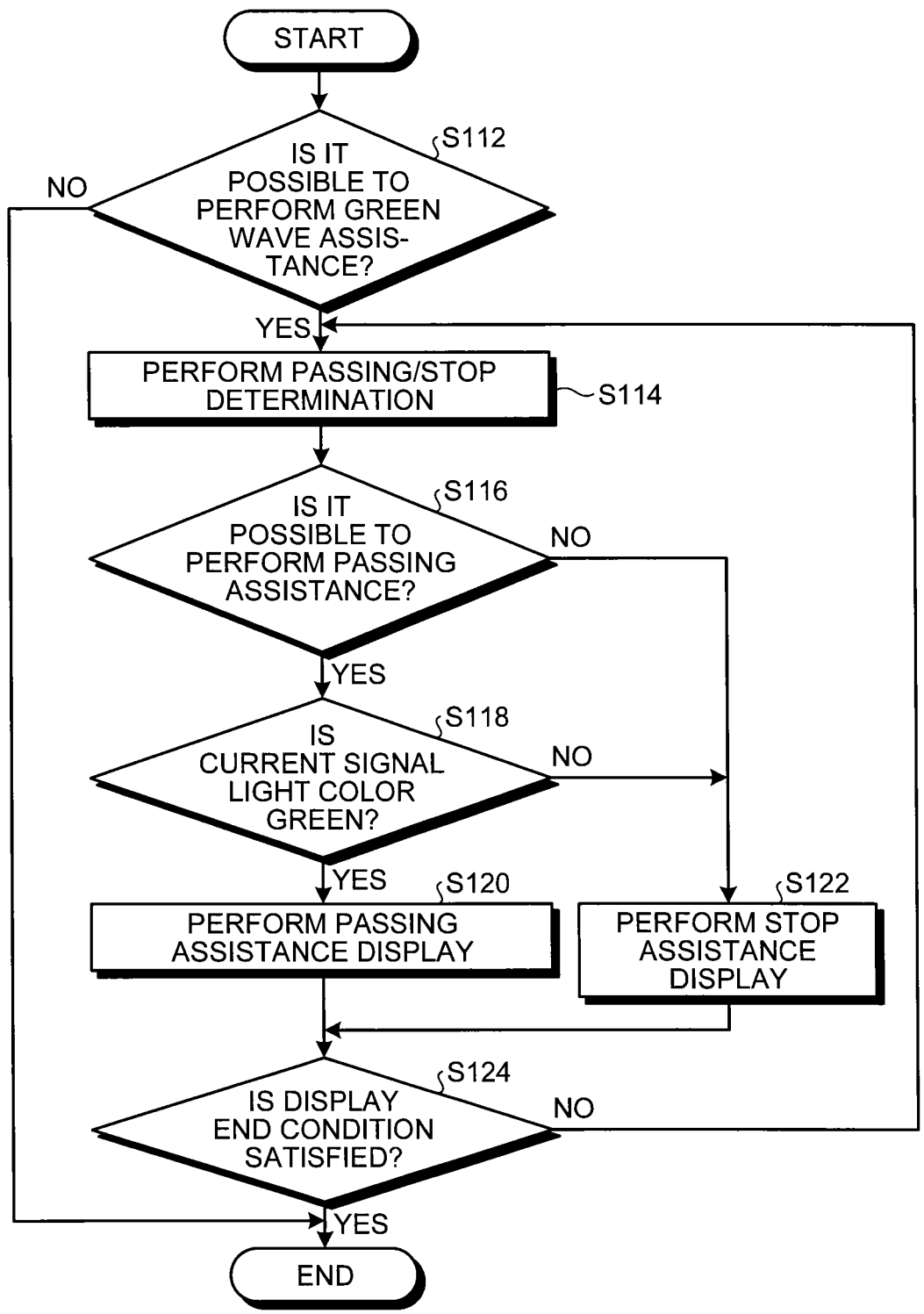
FIG. 7 is a flowchart illustrating an exemplary process of an ECU.
Figure 8:
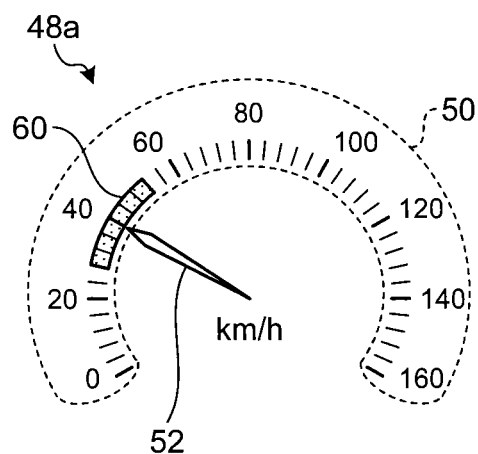
FIG. 8 is a schematic diagram illustrating an exemplary speed display area of a display device.
Figure 9:
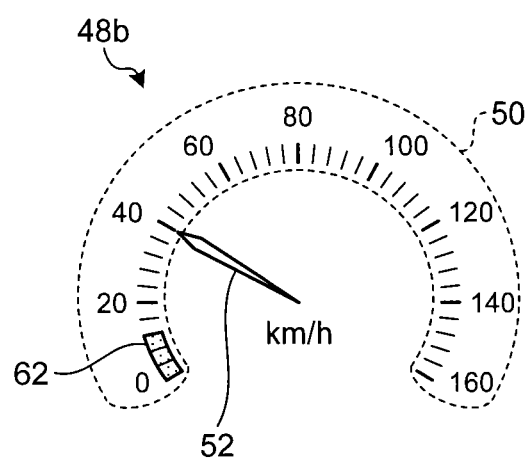
FIG. 9 is a schematic diagram illustrating an exemplary speed display area of a display device.

First, control performed by the driving assistance control unit 20d of the ECU 20 of the vehicle 10 will be described in detail with reference to FIGS. 7 to 9. FIG. 7 is a flowchart illustrating an exemplary process of the driving assisting device. FIGS. 8 and 9 are schematic diagrams illustrating an exemplary speed display area of the display device.

In step S112, the driving assistance control unit 20d of the ECU 20 determines whether or not it is possible to perform the green wave assistance. Specifically, the driving assistance control unit 20d determines whether or not a condition capable of displaying the target vehicle speed range is satisfied in a state in which information necessary for calculating the target vehicle speed range can be acquired. Examples of the information necessary for calculating the target vehicle speed range include the infrastructure information such as the lighting cycle or the signal change timing of the traffic signals 12 and 12*a* of the passing target, the current position information necessary for calculating the distance between the vehicle 10 and the traffic signals 12 and 12*a*, and map information including the positional information of the traffic signals 12 and 12*a*. Examples of the condition capable of displaying the target vehicle speed range includes a condition in which the distance between the vehicle 10 and the traffic signals 12 and 12*a* (a distance from a target intersection or the like) is a certain distance or larger and a condition in which a current vehicle speed of the vehicle 10 is a certain speed or faster. When the distance between the vehicle 10 and the traffic signals 12 and 12*a* (a distance to a target intersection or the like) is less than the certain distance, the driving assistance control unit 20*d* determines not to perform the green wave assistance since it is difficult for the driver to drive according to the display even when the target vehicle speed range is displayed. Further, when the current vehicle speed of the vehicle 10 is less than the certain speed, the driving assistance control unit 20*d* determines not to perform the green wave assistance since there is a high possibility that the traveling speed is limited due to traveling on a congested road, or the vehicle is about to stop or is being stopped due to a certain reason, and it is difficult for the driver to drive according to the display even when the target vehicle speed range is displayed. When it is determined in step S112 that it is difficult to perform the assistance (No), that is, when the assistance is determined to be hardly performed, the driving assistance control unit 20*d* ends the present process.

Further, when it is determined in step S112 that it is possible to perform the assistance (Yes), in step S114, the driving assistance control unit 20*d* performs a passing/stop determination. In other words, in step S114, the driving assistance control unit 20*d* calculates the reference target vehicle speed range based on the acquired information, and determines whether passing assistance or stop assistance is performed based on the calculated reference target vehicle speed range. Here, the reference target vehicle speed range refers to a range of a vehicle speed at which it is possible to pass through a target intersection, a target pedestrian crossings, or the like, that is, a range of a vehicle speed at which it is possible to pass through a target pedestrian crossings, or the like while the target traffic signal is the green signal. Further, when the lower limit of the calculated reference target vehicle speed range is faster than the current vehicle speed by a speed a, that is, when (current vehicle speed+α)<(lower limit speed of reference target vehicle speed range), the driving assistance control unit 20*d* according to the present embodiment determines to perform the stop assistance.

When the determination is performed in step S114, in step S116, the driving assistance control unit 20*d* determines whether or not it is possible to perform the passing assistance, that is, whether or not the determination result of step S114 is the passing assistance. When it is determined in step S116 that it is difficult to perform the passing assistance (No), the driving assistance control unit 20*d* causes the process to proceed to step S122.

Further, when it is determined in step S116 that it is possible to perform the passing assistance (Yes), that is, the determination result of step S114 is the passing assistance, in step S118, the driving assistance control unit 20*d* determines whether or not a current signal light color is green. In other words, the driving assistance control unit 20*d* determines whether or not the traffic signal arranged at an intersection or a pedestrian crossing (that is, a traffic signal location) of a passing target is in a state in which the green signal is turned on. The driving assistance control unit 20*d* determines whether or not the traffic signal is in a state in which the green signal is turned on based on the signal cycle of the traffic signal acquired through the infrastructure information. When the light color is determined to be not green in step S118 (No), that is, when the traffic signal does not perform a display indicating that it is possible to pass, that is, when the traffic signal is determined to correspond to a passing prohibition display period of time, the driving assistance control unit 20*d* causes the process to proceed to step S122. When the traffic signal corresponds to the passing prohibition display period of time, it means a state in which the traffic signal is displaying passing prohibition, that is, a state in which the traffic signal is displaying the red signal. Further, the passing prohibition display period of time of the traffic signal may include a state in which the traffic signal is displaying the yellow signal.

Meanwhile, when the light color is determined to be green in step S118 (Yes), the driving assistance control unit 20*d* performs a passing assistance display. For the passing assistance display in step S120, the driving assistance control unit 20*d* decides the target vehicle speed range based on the reference target vehicle speed range, and causes the decided target vehicle speed range to be displayed on the speed display area. Here, the driving assistance control unit 20*d* preferably adjusts the target vehicle speed range to be displayed on the speed display area 48 based on the reference target vehicle speed range calculated in step S114, the current vehicle speed, and a previously set condition. The driving assistance control unit 20*d* according to the present embodiment sets the upper limit value (display upper limit speed) of the target vehicle speed range to be (current vehicle speed+α) or lower.

For example, the driving assistance control unit 20*d* displays a speed display area 48*a* illustrated in FIG. 8. The speed display area 48*a* displays a mark 60 on a speed range overlapping the target vehicle speed range of the scale display portion 50. Here, in the present embodiment, the target vehicle speed range is 30 km/h to 50 km/h, and thus the speed display area 48*a* displays the mark 60 on the speed range of 30 km/h to 50 km/h. Further, when an image is displayed on an LCD device as the scale display portion 50, the speed display area 48*a* may cause an image of the mark 60 to overlap as an image displayed on the LCD device. Further, when the scale display portion 50 is written in ink, the speed display area 48*a* may display the mark 60 such that a light-emitting unit is arranged on the scale display part of the scale display portion 50, and the light-emitting unit of the target vehicle speed range is turned on. As described above, the driving assistance control unit 20*d* displays the mark 60 to overlap the target vehicle speed range as the decided target vehicle speed range, so that the user can recognize the decided target vehicle speed range. Here, when a part of the reference target vehicle speed range calculated in step S114 is higher than (current vehicle speed+α), the driving assistance control unit 20*d* according to the present embodiment sets (current vehicle speed+α) as the upper limit value of the target vehicle speed range, and does not display a speed higher than (current vehicle speed+α). When the process of step S120 is performed, the driving assistance control unit 20*d* causes the process to proceed to step S124.

When it is determined in step S116 that it is possible to perform the passing assistance (No) or when the light color is determined to be not green in step S118 (No), in step S122, the driving assistance control unit 20*d* performs a stop assistance display. Here, in the stop assistance display, a speed range around 0 km/h is displayed as the target vehicle speed range. For example, the driving assistance control unit 20*d* displays a speed display area 48*b* illustrated in FIG. 9. The speed display area 48*b* displays a mark 62 on a speed range overlapping the target vehicle speed range of the scale display portion 50. Here, in the stop assistance display, since the target vehicle speed range is a speed range around 0 km/h (a speed range including 0 km/h, and from 0 km/h to 10 km/h in the present embodiment), the speed display area 48*b* displays the mark 62 on the speed range around 0 km/h. As described above, the driving assistance control unit 20*d* displays the mark 62 to overlap the scale display portion 50 as the decided target vehicle speed range, so that the user can recognize the decided target vehicle speed range. Thus, the user can recognize that it is recommended to stop the vehicle in step S122. Further, the driving assistance control unit 20*d* preferably performs a display of an accelerator off instruction in addition to a display of causing the mark 62 to be displayed on a speed range around 0 km/h. Thus, it is possible to prevent the driver from performing abrupt deceleration, and it is possible to prevent the vehicle from stopping at a location distant from a target location. Furthermore, it is possible to increase a traveling distance in a free run state and more efficiently perform driving. When the process of step S122 is performed, the driving assistance control unit 20*d* causes the process to proceed to step S124.

When the process of step S120 or the process of step S122 is performed, in step S124, the driving assistance control unit 20*d* determines whether or not a display end condition is satisfied. Here, the display end condition refers to a previously set condition for ending the display of target vehicle speed range, and is satisfied, for example, when the distance between the vehicle and the intersection (the target traffic signal) is a certain distance or less, when the vehicle speed is beyond a certain range, or when a certain period of time elapses after the target vehicle speed range is displayed. When the condition is determined to be not satisfied in step S124 (No), the driving assistance control unit 20*d* causes the process to proceed to step S114, and repeats the above-described process. In other words, the target vehicle speed range is calculated again, and the target vehicle speed range is displayed again. When the condition is determined to be satisfied in step S124 (Yes), the driving assistance control unit 20*d* ends the present process.

Figure 10:
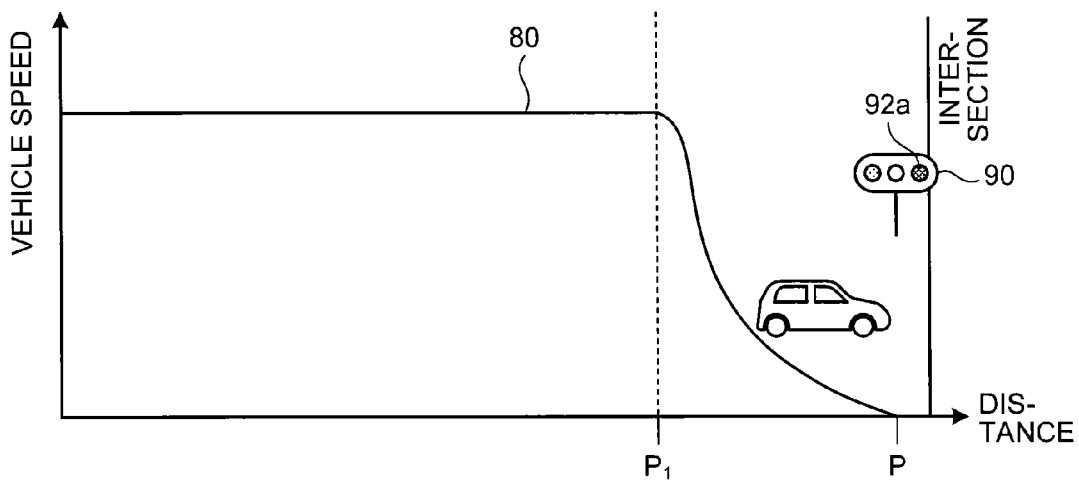
FIG. 10 is a schematic diagram illustrating a relation between a remaining distance to a traffic signal location and a vehicle speed.
Figure 11:
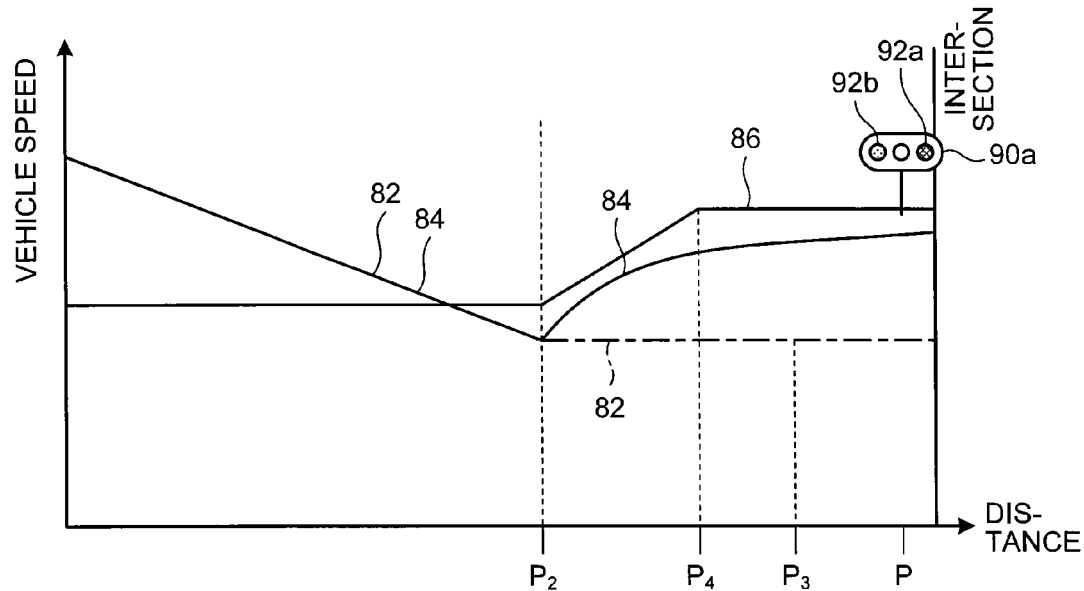
FIG. 11 is a schematic diagram illustrating a relation between a remaining distance to a traffic signal location and a vehicle speed.

FIG. 10 is a schematic diagram illustrating a relation between a remaining distance to a traffic signal location and a vehicle speed. FIG. 11 is a schematic diagram illustrating a relation between a remaining distance to a traffic signal location and a vehicle speed. Here, FIGS. 10 and 11 are diagrams illustrating the distance to the intersection location and the speed of the vehicle 10 moving toward to the intersection location. In FIGS. 10 and 11, a vertical axis denotes a vehicle speed, and a horizontal axis denotes a distance. In FIGS. 10 and 11, a stop line corresponding to an intersection at which a traffic signal 90 is installed is installed at a distance P.

When traveling is performed without performing the fuel economy improvement assistance (driving assistance), the vehicle 10 travels toward an intersection location at a constant speed as indicated by a traveling pattern 80 illustrated in FIG. 10, and when the traffic signal 90 is changed to red, that is, when a red display light 92*a* of the traffic signal 90 is turned on, the vehicle 10 starts to decelerate, and stops at the position P of the stop line. In the example illustrated in FIG. 10, the deceleration starts at a position $P_1$ before the position P.

On the other hand, when the fuel economy improvement assistance (driving assistance) is performed, the vehicle 10 can adjust the vehicle speed so that the vehicle passes through the intersection location in the state in which the traffic signal 90 is the green signal. Specifically, as illustrated in FIG. 11, the vehicle 10 calculates a vehicle speed that causes the vehicle 10 to pass through the intersection location in the state in which a traffic signal 90*a* is green, that is, in the state in which a green display light 92*b* of the traffic signal 90*a* is turned on, and gives guidance of the calculated vehicle speed to the driver. The present embodiment has been described in connection with the example in which the green display light 92*b* is turned on, but the same can apply even when the red display light 92*a* is turned on, and an arrow signal indicating a moving direction is being displayed. In other words, the same can apply even in a state in which traveling can be performed in a moving direction at an intersection location.

Specifically, a notification of the target vehicle speed range is given to the driver. In the example illustrated in FIG. 11, the target vehicle speed range is the speed range lower than the current vehicle speed, and when the target vehicle speed range is displayed, the driver can cause the vehicle 10 to decelerate as indicated by a traveling pattern 82. At this time, the driver can suppress fuel consumption by releasing the accelerator or decreasing the accelerator opening degree. Thereafter, when the vehicles reaches the target vehicle speed range at a position $P_2$, the driver maintains the target vehicle speed as indicated by the traveling pattern 82. Thereafter, when the green display light 92*b* of the traffic signal 90*a* is turned on at the position $P_3$, the driver can pass through the intersection location in the green signal state.

Next, a traveling pattern 84 illustrated in FIG. 11 is a traveling pattern in which the vehicle can pass through the intersection location by temporarily performing accelerator-off deceleration. When an acceleration-off recommendation is displayed as the driving assistance, the driver performs an accelerator-off operation and causes the vehicle 10 to decelerate as indicated by the traveling pattern 84. Thereafter, when the green display light 92*b* of the traffic signal 90*a* is turned on at the position $P_2$, an accelerator-on operation is performed, and the vehicles passes through the intersection location accelerating up to a certain speed.

Next, a traveling pattern 86 illustrated in FIG. 11 is a traveling pattern in which the vehicle can pass through the intersection location by accelerating to increase a traveling speed. When the speed range in which the target vehicle speed range is higher than the current vehicle speed is displayed as the driving assistance at the position $P_2$, the driver performs an acceleration operation and causes the vehicle 10 to accelerate as indicated by the traveling pattern 86. Thereafter, when the vehicle reaches the target vehicle speed range at the position $P_4$, the driver maintains the target vehicle speed as indicated by the traveling pattern 86, and the vehicle can pass through the intersection location in the green signal state. The traveling pattern 86 represents an example in which the traffic signal displays the green signal from the beginning of the driving assistance.

As the driving assistance of displaying the target vehicle speed range is performed, the vehicle 10 can easily pass through the intersection in the green signal state as illustrated in FIGS. 10 and 11. Thus, it is possible to prevent the vehicle 10 from stopping and prevent a speed width between acceleration and deceleration from increasing, and thus a fuel economy can be improved. Further, as the fuel economy improvement assistance is performed, the vehicle 10 can adjust the speed in advance and adjust the speed in a lengthy zone. Thus, when the speed gradually decrease as described above, it is possible to perform deceleration through the accelerator-off operation and thus improve a fuel economy.

The traffic control system 1 and the traffic control device 17 perform the fuel economy improvement assistance (driving assistance) to be executed by the vehicle 10 through the simulation of the fuel economy improvement assistance. Thus, it is possible to detect a fuel economy of a vehicle traveling while passing through an intersection location with a high degree.

Further, the vehicle 10, the traffic control system 1 and the traffic control device 17 performs switching between the passing assistance display and the stop assistance display based on the lighting state of the traffic signal, specifically, such that the passing assistance display is performed when the traffic signal of the passing target is the green signal, and the stop assistance display is performed when the traffic signal of the passing target is not the green signal, and thus it is possible to prevent the displayed target vehicle speed range from causing the driver to be uncomfortable. In other words, when the driver needs to decrease the speed, for example, when the traffic signal ahead is the red signal, the vehicle 10, the traffic control system 1, and the traffic control device 17 can prevent the target vehicle speed range in which the speed needs to be maintained or increase from being displayed, and thus it is possible to prevent the displayed target vehicle speed range from causing the driver to be uncomfortable.

Furthermore, the vehicle 10, the traffic control system 1, and the traffic control device 17 according to the present embodiment determines whether or not it is possible to perform the passing assistance, specifically, determines whether or not the calculated reference target vehicle speed range exceeds an upper limit value set based on the current vehicle speed, and performs the stop assistance display when the calculated reference target vehicle speed range exceeds the upper limit value set based on the current vehicle speed, and thus it is possible to prevent the reference target vehicle speed range in which abrupt acceleration is necessary to pass through a target intersection or a target pedestrian crossings from being displayed as the target vehicle speed range. Accordingly, it is possible to prevent the target vehicle speed range in which abrupt acceleration is necessary from being displayed, and thus it is possible to display the target vehicle speed range that is unlikely to give an uncomfortable feeling or a stress to the driver. Further, since traveling can be performed in the target vehicle speed range through acceleration and deceleration of an appropriate range, the driver can cause the vehicle to travel in an optimal condition (in which the number of stoppages by the red signal is reduced in (the present embodiment) while maintaining a conformable driving state.

Further, when the calculated reference target vehicle speed range exceed the upper limit value set based on the current vehicle speed, the vehicle 10, the traffic control system 1, and the traffic control device 17 perform the stop assistance display, and cause the target vehicle speed range to be displayed on the speed display area 48 to be equal to or lower than the upper limit value set based on the current vehicle speed. In other words, the vehicle 10, the traffic control system 1, and the traffic control device 17 can prevent the speed higher than the upper limit value (the display upper limit speed) set based on the current vehicle speed from being displayed on the speed display area 48 as the target vehicle speed range. Thus, the vehicle 10, the traffic control system 1, and the traffic control device 17 can prevent the target vehicle speed range in which abrupt acceleration is necessary from being displayed and can display the target vehicle speed range that is unlikely to give an uncomfortable feeling or a stress to the driver. Furthermore, since traveling can be performed in the target vehicle speed range through acceleration and deceleration of an appropriate range, the driver can cause the vehicle to travel in an optimal condition in which the number of stoppages by the red signal is reduced in (the present embodiment) while maintaining a conformable driving state.

Further, the vehicle 10, the traffic control system 1, and the traffic control device 17 set (current vehicle speed+α), that is, the speed that is higher than the current vehicle speed by a certain speed as a reference speed used to determine whether or not it is possible to give the passing assistance, and thus it is possible to prevent acceleration necessary to cause the vehicle speed to reach the target vehicle speed range from increasing. Thus, the vehicle 10 can display the target vehicle speed range that is unlikely to give an uncomfortable feeling or a stress to the driver. Further, the traffic control device 17 may perform control such that the vehicle passes through the intersection location at an arbitrary speed at a speed position detected through the passing assistance.

Further, when it is difficult to give the passing assistance, specifically, when the reference target vehicle speed range is higher than the display upper limit speed, the vehicle 10, the traffic control system 1, and the traffic control device 17 can display the target vehicle speed range of the stop assistance and recommend the driver to stop. Thus, when abrupt acceleration is necessary to pass through a target traffic signal, the vehicle 10, the traffic control system 1, and the traffic control device 17 can recommend the driver to stop without recommending unfeasible driving, and thus it is possible to reduce an uncomfortable feeling or a stress given to the driver. Furthermore, the vehicle 10, the traffic control system 1, and the traffic control device 17 display the speed as the stop assistance but may perform any other driving assistance.

The present embodiment has been described in connection with the example in which the target vehicle speed range of the stop assistance is displayed when it is difficult to give the passing assistance, specifically, when the reference target vehicle speed range is higher than the display upper limit speed or when the traffic signal is not the green signal, but the present invention is not limited to this example. When it is difficult to perform the passing assistance, the vehicle 10 may not display the target vehicle speed range instead of the process of step S122.

The vehicle 10, the traffic control system 1, and the traffic control device 17 according to the present embodiment use (current vehicle speed+α), that is, the speed higher than the current vehicle speed by a certain speed as the display upper limit speed (the reference speed used to determine whether or not it is possible to perform the passing assistance), but the present invention is not limited to this example. Here, the vehicle 10 may use (current vehicle speed+G×t) as the display upper limit speed. Here, G represents acceleration, and t represents a time. In other words, the vehicle 10, the traffic control system 1, and the traffic control device 17 may use (current vehicle speed+G×t), that is, the speed that can be achieved by the acceleration G during t seconds as the reference speed used to determine whether or not it is possible to perform the passing assistance. Here, t seconds may be a value that changes based on the distance to the traffic signal and the current vehicle speed. For example, t may be increased when the distance to the traffic signal is large, and t may be decreased when the distance to the traffic signal is small.

Further, the vehicle 10 according to the present embodiment may use the display upper limit speed as the current vehicle speed. When the current vehicle speed is used as the reference speed used to determine whether or not it is possible to perform the passing assistance as described above, the driving assistance control unit 20d can use a speed that need not to be increased as the target vehicle speed range. Thus, since the target vehicle speed range that needs to be increased is not displayed for the driver, and thus the vehicle 10, the traffic control system 1, and the traffic control device 17 can display the target vehicle speed range that is unlikely to give an uncomfortable feeling or a stress to the driver.

Further, the vehicle 10 according to the above-described embodiment decides the display upper limit speed using the current vehicle speed, but the present invention is not limited to this example. The vehicle 10 may use a speed limit of a road on which the vehicle 10 is traveling as the display upper limit speed. Here, the speed limit is a legal speed of a road on which the vehicle 10 is currently traveling, for example, and may be acquired based on the infrastructure information acquired through the infrastructure communicating unit 38 or the current position information obtained such that a current position is detected using the GPS signals received through the GPS communicating unit 32 and stored in the map information database 22a. The vehicle 10 may use a combination of either the infrastructure communicating unit 38 and the GPS communicating unit 32 and the map information database 22a as information acquiring unit that acquires information of the speed limit. Any other function of the vehicle 10, for example, the in-vehicle camera 34 may be used as the information acquiring unit that acquires information of the speed limit. The vehicle 10 may acquire an image of a mark installed on a road on which the vehicle is traveling through the in-vehicle camera 34 and detect a legal speed displayed on the image of the mark as the speed limit. The vehicle 10 can prevent the display of the target vehicle speed range from exceeding the speed limit using the speed limit as the reference speed used to determine whether or not it is possible to perform the passing assistance. Thus, since the speed of the speed limit or lower can be displayed as the target vehicle speed range, the vehicle 10 can prevent the speed at which traveling is not actually allowed from being displayed and display the target vehicle speed range that is unlikely to give an uncomfortable feeling or a stress to the driver.

More preferably, the vehicle 10 according to the above embodiment decides the display upper limit speed (the reference speed used to determine whether or not it is possible to perform the passing assistance) using both the current vehicle speed and the speed limit. In other words, preferably, the vehicle 10 causes the target vehicle speed range not to exceed the speed limit even when the display upper limit speed is decided using the current vehicle speed. Thus, the vehicle 10 can obtain the above-described effects using both speeds and display the target vehicle speed range that is unlikely to give an uncomfortable feeling or a stress to the driver.

Further, the vehicle 10 according to the above embodiment has been described in connection with the example in which the reference speed used to determine whether or not it is possible to perform the passing assistance is used as the display upper limit speed, and various kinds of conditions are used as the display upper limit speed, but the reference speed used to determine whether or not it is possible to perform the passing assistance and the display upper limit speed may be separately set. In other words, the vehicle 10 may determines whether or not the passing assistance is performed using the reference speed used to determine whether or not it is possible to perform the passing assistance and decide an upper limit value to be displayed as the target vehicle speed range based on the display upper limit speed different from the reference speed used to determine whether or not it is possible to perform the passing assistance. Furthermore, various kinds of conditions described above may be used as the display upper limit speed, similarly to the reference speed used to determine whether or not it is possible to perform the passing assistance. In this case, the vehicle 10 adjusts the reference target vehicle speed range based on the display upper limit speed to decide the target vehicle speed range.

Preferably, the vehicle 10 displays marks of different colors for the target vehicle speed range displayed at the time of the passing assistance and the target vehicle speed range displayed at the time of the stop assistance. Further, marks may have different shapes, lighting states, or the like instead of different colors. Thus, the driver can immediately recognize whether the passing assistance is being displayed or the stop assistance is being displayed.

Further, the vehicle 10, the traffic control system 1, and the traffic control device 17 determine whether the passing assistance or the stop assistance is performed, but may constantly perform the passing assistance. The vehicle 10, the traffic control system 1, and the traffic control device 17 may perform the driving assistance and the fuel economy improvement assistance according to actual traveling by specifying the speed range as described above.

Figure 12:
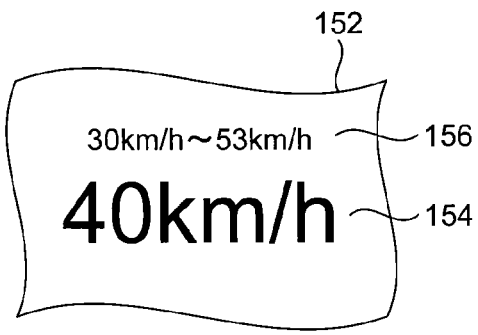
FIG. 12 is a schematic diagram illustrating another exemplary speed display area of a display device.

Further, the vehicle 10 according to the above embodiment displays the speed on the speed display area 48 of the display device 42 using an analog meter, but the present invention is not limited to this example. The vehicle 10 according to the above embodiment may display the speed on the speed display area 48 of the display device 42 using a digital meter. Here, FIG. 12 is a schematic diagram illustrating another exemplary speed display area of a display device. A speed display area 152 is a display mechanism that displays a speed using a number, and includes a first area 154 and a second area 156. The first area 104 is an area on which the current vehicle speed is displayed. The first area 154 of FIG. 12 displays "40 km/h." The second area 156 is an area of the first area 154 an upper side of a screen, and displays the target vehicle speed range. The second area 156 of FIG. 12 displays "30 km/h to 53 km/h." As described above, the vehicle 10 can obtain the same effects as ones described above even when the speed display area 152 of the display device 42 is displayed using a digital meter. Here, preferably, the vehicle 10 displays the current vehicle speed displayed on the first area 154 of the speed display area 152 and the target vehicle speed range displayed on the second area 156 in either or both of different colors and different sizes. Thus, the vehicle 10 can prevent the driver from confusing the current vehicle speed with the target vehicle speed range.

Figure 13:
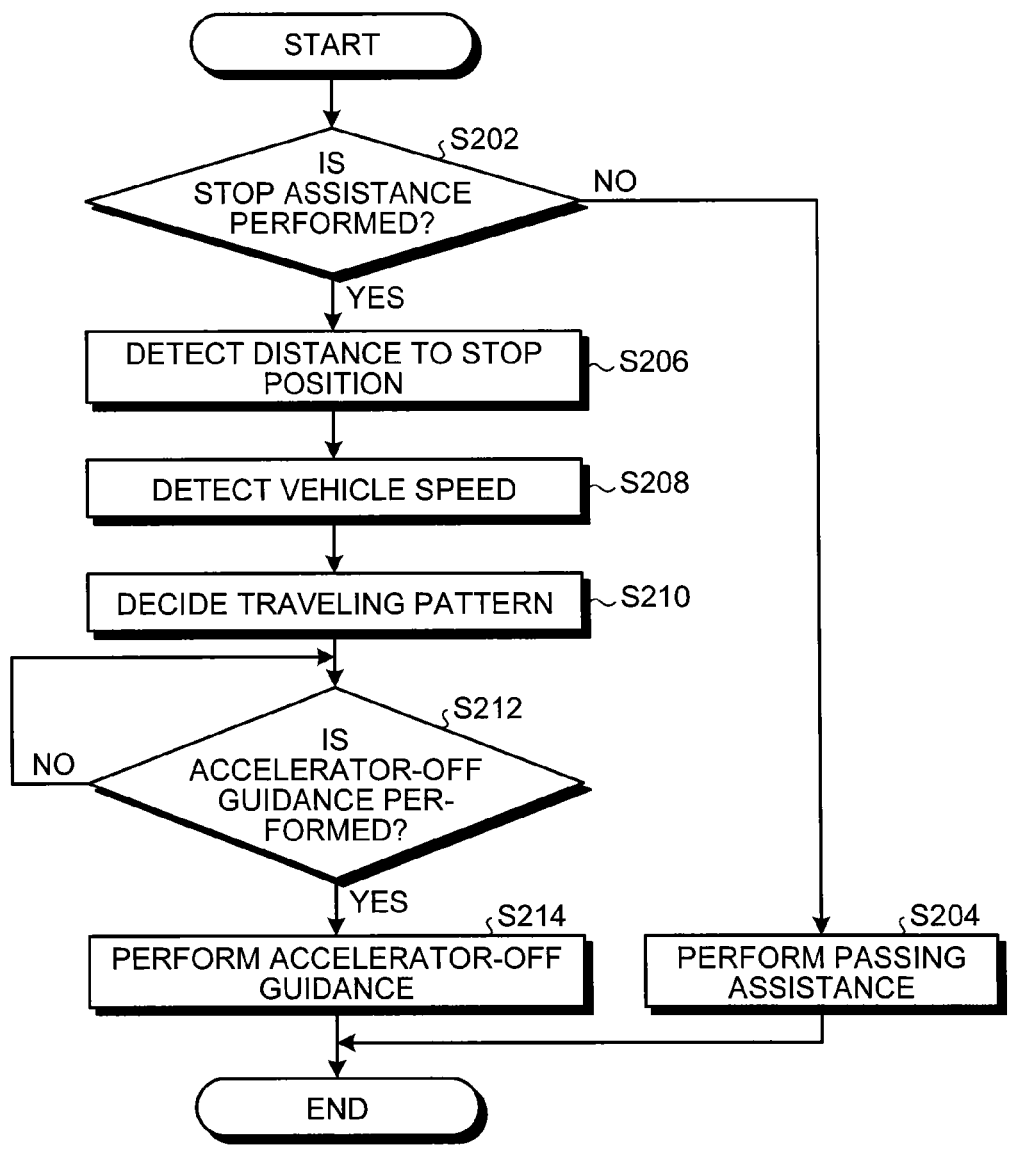
FIG. 13 is a flowchart illustrating an exemplary process of an ECU.
Figure 14:
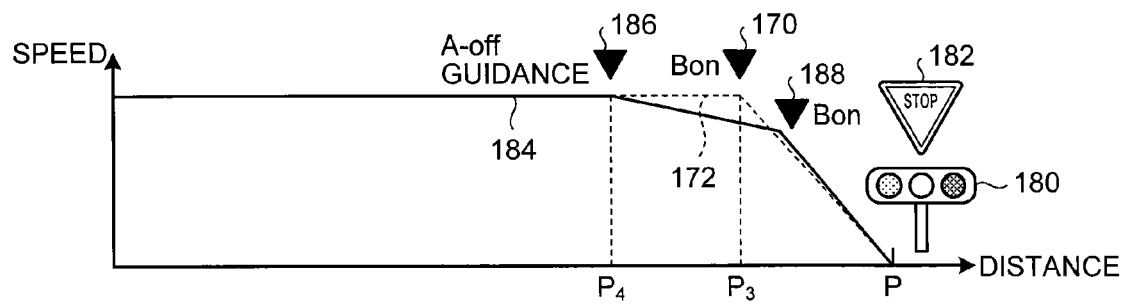
FIG. 14 is a schematic diagram illustrating a relation between a remaining distance to a stop position and a vehicle speed.

Next, another exemplary fuel economy improvement assistance (driving assistance) will be described with reference to FIGS. 13 and 14. FIG. 13 is a flowchart illustrating an exemplary process of an ECU. In step S202, the ECU 20 determines whether or not the stop assistance is performed. When the stop assistance is determined to be not performed in step S202 (No), in step S204, the ECU 20 performs the passing assistance. As the passing assistance, the target vehicle speed range is displayed. Further, when the stop assistance is not performed, the ECU 20 may end the present process without performing the process particularly.

When the stop assistance is determined to be performed (Yes) in step S202, the ECU 20 detects a distance to a stop position in step S206, detects a vehicle speed in step S208, and decides a traveling pattern in step S210. Here, a traveling pattern in which the vehicle can stop at the stop position (for example, a stop line of an intersection) with small fuel consumption without giving an uncomfortable feeling to the driver is used as the traveling pattern. The traveling pattern includes a timing for guiding an accelerator-off operation.

When the traveling pattern is decided in step S210, in step S212, the ECU 20 determines whether or not accelerator-off guidance is performed. When the accelerator-off guidance is determined to be not performed in step S212 (No), that is, when the vehicle is determined not to reach a position or a timing for guiding an accelerator-off operation, the ECU 20 causes the process to proceed to step S212. As described above, the ECU 20 repeats the process of step S212 until the accelerator-off guidance is determined to be performed. When the accelerator-off guidance is determined to be performed in step S212 (Yes), in step S214, the ECU 20 performs accelerator-off guidance, and ends the present process. Here, in the accelerator-off guidance, the driver is recommended to turn off the accelerator or open the accelerator pedal or the like.

A concrete description is given below with reference to FIG. 14. In the case in which the fuel economy improvement assistance (the driving assistance) is not performed, as the driver who has determined the vehicle 10 arrives at a traffic signal 180 displaying red or a position having a mark 182 indicating a temporary stop performs a deceleration operation, the vehicle 10 stops around a position P at which a stop line corresponding to the traffic signal 180 or the mark 182 is arranged. In this case, the vehicle 10 follows a deceleration pattern 172 that starts to decelerate as a brake operation is performed at a position $P_3$ serving as a brake-on point 170, and stops at the position P as illustrated in FIG. 14.

On the other hand, in the case in which the fuel economy improvement assistance (the driving assistance) is performed, when it is detected that the vehicle 10 arrives at the traffic signal 180 displaying red or the position having the mark 182 indicating a temporary stop, the vehicle 10 performs the stop assistance using the position P at which the stop line corresponding to the traffic signal 180 or the mark 182 is arranged as a target stop position. Specifically, the vehicle 10 calculates a deceleration pattern in which the vehicle can stop at the position P, and decides an accelerator-off guidance point 186 at a position $P_4$ and a brake-on guidance point 188 for implementing a deceleration pattern 184 as indicated by a deceleration pattern 184 of FIG. 14. The accelerator-off guidance point 186 is a timing at which an image for guiding the driver to perform an accelerator-off operation is displayed. The brake-on guidance point 188 is a timing at which an image for guiding the driver to perform a brake-on operation, that is, a brake operation is displayed. The vehicle 10 calculates a timing at which various kinds of purposes can be implemented at a high level, for example, the vehicle can appropriately stop at a target stop position, braking can be implemented with a braking distance by appropriate deceleration, or power is generated by engine brake regeneration as the accelerator-off guidance point 186. Further, the vehicle 10 may calculate the deceleration pattern 184, the accelerator-off guidance point 186, and the brake-on guidance point 188 as the target traveling state quantity or may calculate the accelerator-off guidance point 186 and the brake-on guidance point 188 as the target traveling state quantity.

When the vehicle arrives at the calculated accelerator-off guidance point 186 and the brake-on guidance point 188 based on the current position and the current vehicle speed, the vehicle 10 causes an image corresponding to a corresponding operation to be displayed on the display device 42. The accelerator-off guidance point 186 and the brake-on guidance point 188 of the vehicle 10 represent a period of time related to until an operation is performed after an image is displayed, and a certain period of time before a desired operation start point in time may be used as the accelerator-off guidance point 186 and the brake-on guidance point 188. As described above, the vehicle 10 outputs the driving assistance information based on the target traveling state quantity such as the calculated deceleration pattern 184, the accelerator-off guidance point 186, and the brake-on guidance point 188, and thus it is possible to perform stop operation assistance capable of causing the vehicle 10 to decelerate in a pattern according to the deceleration pattern 184, appropriately stopping the vehicle at the target stop position, implementing braking with a braking distance by appropriate deceleration, and generating power by engine brake regeneration. Further, as the vehicle 10 travels according to the deceleration pattern 184, the vehicle 10 can travel in the accelerator-off state from the position $P_4$ to the position P. Accordingly, the vehicle 10 can travel a long zone in the accelerator-off state, compared to the deceleration pattern 172 in which traveling of the accelerator-off state is performed from the position $P_3$ to the position P, and thus a fuel economy can be improved.

The vehicle 10 may calculate an estimation variation distance Y with respect to the stop position and set a position obtained by shifting the target stop position to a position in front of an actual stop position as the target stop position. As the stop position is corrected as described above, it is possible to perform the stop assistance of assisting the vehicle to stop at an actual stop position, for example, even when another vehicle is present at the stop position. Here, the vehicle 10 may calculate the variation distance Y based on various kinds of information. For example, the vehicle 10 may acquire information of a vehicle ahead of its own vehicle through the inter-vehicle communicating unit 39 and calculate the estimation variation distance Y based on the acquired number of vehicles. Further, the vehicle 10 may accumulate information of an actual stop position through the traffic control device 17, calculate a prediction value based on information such as an accumulation result, a traveling time, and a date and time, and use the calculated prediction value as the estimation variation distance Y.

Further, preferably, the traffic control system 1 and the traffic control device 17 performs fuel economy evaluation and traveling route decision in view of a change in fuel consumption caused by driving mode switching as well as the simulation of the fuel economy improvement assistance. The traffic control system 1 and the traffic control device 17 may adjust a route to be decided in view of a toll, a traveling distance, a required period of time, or the like, similarly to normal route guidance.

The traffic control system 1 according to the embodiment acquires the road traffic information through communication with the roadside unit (ITS spot) 15 and thus efficiently acquires the road information of a wide area. The vehicle 10 of the traffic control system 1 according to the embodiment acquires the road traffic information through communication with the roadside unit, but the present invention is not limited to this example. The vehicle 10 may receive a radio wave output as a radio wave for radio broadcasting or a radio wave for television broadcasting through various kinds of wireless communication and acquire road traffic information included in the radio wave.

Furthermore, the vehicle 10 of the traffic control system 1 according to the embodiment includes the traffic information communicating unit 29, the infrastructure communicating unit 38, the inter-vehicle communicating unit 39, and the center communicating unit 7 as the communicating unit, but the number of communicating units is not limited as long as communication with each target can be performed. For example, in the vehicle 10, communicating units of the same communication scheme may perform functions of both communicating units through a single antenna or a single communication function. In other words, a plurality of communicating units of the vehicle 10 may be implemented as a single communicating unit.

REFERENCE SIGNS LIST

1 TRAFFIC CONTROL SYSTEM
10 VEHICLE
12, 12a TRAFFIC SIGNAL
14 INFRASTRUCTURE INFORMATION TRANSMITTING DEVICE
15 ROADSIDE UNIT
16 GPS SATELLITE
17 TRAFFIC CONTROL DEVICE
18 TRAFFIC CONTROL CENTER
19 ROAD TRAFFIC INFORMATION MANAGEMENT CENTER
20 ECU
20a DRIVE CONTROL UNIT
20b COMMUNICATION CONTROL UNIT
20c GUIDANCE ROUTE CONTROL UNIT
20d DRIVING ASSISTANCE CONTROL UNIT
22 STORAGE UNIT
24 ACCELERATOR ACTUATOR
25a ENGINE
25b MG (MOTOR GENERATOR)
26 BRAKE ACTUATOR
28 CAR NAVIGATION DEVICE
30 SPEAKER
32 GPS COMMUNICATING UNIT
34 IN-VEHICLE CAMERA
36 MILLIMETER-WAVE RADAR
38 INFRASTRUCTURE COMMUNICATING UNIT
40 SPEED SENSOR
42 DISPLAY DEVICE
44 HYBRID ECU
46 BATTERY ACTUATOR
47 TRAFFIC CONTROL COMMUNICATING UNIT
48 SPEED DISPLAY AREA
102 VEHICLE COMMUNICATING UNIT
104 CONTROL CENTER COMMUNICATING UNIT
106 MANAGEMENT CENTER COMMUNICATING UNIT
108 CONTROL UNIT
110 DATABASE
120 COMMUNICATION CONTROL UNIT
122 ROUTE CALCULATING UNIT (ROUTE SEARCH UNIT)
124 SIMULATION UNIT (FUEL CONSUMPTION SIMULATING UNIT)

The invention claimed is:

1. A traffic control device comprising:
a route calculating unit configured to detect candidates of a route to a destination, and decide a guidance route from the detected route candidates;
an infrastructure communicating unit configured to acquire signal cycle information related to a cycle at which a display of a traffic signal at a traffic signal location on the route calculated by the route calculating unit is switched; and
a fuel consumption simulating unit configured to perform fuel consumption simulation including fuel economy improvement assistance executed at a time of passing the traffic signal location with respect to the route candidates based on the signal cycle information acquired by the infrastructure communicating unit, wherein the route calculating unit decides the guidance route based on the fuel consumption simulation calculated corresponding to the route candidates by the fuel consumption simulating unit.

2. The traffic control device according to claim 1, wherein the fuel economy improvement assistance includes an assistance of notifying a driver of an accelerator-off timing when the traffic signal displays passing prohibition at a time of arrival at the traffic signal location.

3. The traffic control device according to claim 1, wherein the fuel economy improvement assistance includes an assistance of notifying a driver of a speed range capable of passing through the traffic signal location while the traffic signal is in a passage allowance display state.

4. The traffic control device according to claim 2, wherein the fuel economy improvement assistance includes an assistance of notifying a driver of a speed range capable of passing through the traffic signal location while the traffic signal is in a passage allowance display state.

5. The traffic control device according to claim 1, wherein the route calculating unit decides a route having a smallest fuel consumption amount as the guidance route based on the fuel consumption simulation.

6. The traffic control device according to claim 2, wherein the route calculating unit decides a route having a smallest fuel consumption amount as the guidance route based on the fuel consumption simulation.

7. The traffic control device according to claim 3, wherein the route calculating unit decides a route having a smallest fuel consumption amount as the guidance route based on the fuel consumption simulation.

8. A traffic control system comprising:
the traffic control device according to claim 1; and
a vehicle configured to perform communication with the traffic control device, transmit destination information and current position information to the traffic control device, acquire the guidance route transmitted from the traffic control device, and assist driving of the driver based on the acquired guidance route.

9. A traffic control system comprising:
the traffic control device according to claim 2; and
a vehicle configured to perform communication with the traffic control device, transmit destination information and current position information to the traffic control device, acquire the guidance route transmitted from the traffic control device, and assist driving of the driver based on the acquired guidance route.

10. A traffic control system comprising:
the traffic control device according to claim 3; and
a vehicle configured to perform communication with the traffic control device, transmit destination information and current position information to the traffic control device, acquire the guidance route transmitted from the traffic control device, and assist driving of the driver based on the acquired guidance route.

11. A traffic control system comprising:
the traffic control device according to claim 5; and
a vehicle configured to perform communication with the traffic control device, transmit destination information and current position information to the traffic control device, acquire the guidance route transmitted from the traffic control device, and assist driving of the driver based on the acquired guidance route.

* * * * *